(12) United States Patent
Gamble et al.

(10) Patent No.: US 8,109,722 B2
(45) Date of Patent: Feb. 7, 2012

(54) TURBINE AND SYSTEM FOR GENERATING POWER FROM FLUID FLOW AND METHOD THEREFOR

(75) Inventors: Charles R. Gamble, Almondsbury (GB); Steve Taber, Berkeley, CA (US)

(73) Assignee: Nordic Windpower Ltd., Berkeley, CA (US)

( * ) Notice: Subject to any disclaimer, the term of this patent is extended or adjusted under 35 U.S.C. 154(b) by 414 days.

(21) Appl. No.: 12/410,226

(22) Filed: Mar. 24, 2009

(65) Prior Publication Data

US 2009/0317250 A1 Dec. 24, 2009

Related U.S. Application Data

(60) Provisional application No. 61/039,003, filed on Mar. 24, 2008.

(51) Int. Cl.
*F01D 5/18* (2006.01)

(52) U.S. Cl. .................. 416/1; 290/44; 290/55; 415/4.3; 415/4.5; 415/14; 415/48; 415/118; 415/119; 416/9; 416/10; 416/11; 416/12; 416/13; 416/14; 416/15; 416/16; 416/17; 416/40; 416/41; 416/132 B; 416/147; 416/148

(58) Field of Classification Search .................... 290/44, 290/55; 415/4–5, 14.48, 118, 119; 416/1, 416/9–17, 40, 41, 132 B, 147, 148
See application file for complete search history.

(56) References Cited

U.S. PATENT DOCUMENTS

| 4,331,881 | A | 5/1982 | Soderholm et al. |
|---|---|---|---|
| 4,420,692 | A | 12/1983 | Kos et al. |
| 4,435,647 | A | 3/1984 | Harner et al. |
| 4,565,929 | A | 1/1986 | Baskin et al. |
| 5,155,375 | A | 10/1992 | Holley |
| 5,289,041 | A | 2/1994 | Holley |
| 5,354,175 | A | 10/1994 | Coleman et al. |
| 6,856,038 | B2 | 2/2005 | Rebsdorf |
| 6,940,186 | B2 | 9/2005 | Weitkamp |
| 7,285,870 | B2 | 10/2007 | Shubert |
| 2004/0096329 | A1 | 5/2004 | Engstrom |
| 2006/0033338 | A1 | 2/2006 | Wilson |
| 2006/0066111 | A1 | 3/2006 | Suryanarayanan et al. |
| 2006/0070435 | A1 | 4/2006 | LeMieux et al. |
| 2006/0145483 | A1 | 7/2006 | Larsen et al. |
| 2006/0216148 | A1 | 9/2006 | Wobben |
| 2007/0075546 | A1* | 4/2007 | Avagliano et al. .............. 290/44 |

FOREIGN PATENT DOCUMENTS

| JP | 03238376 A | 10/1991 |
|---|---|---|
| JP | 06288336 A | 10/1994 |
| WO | WO 0077394 | 12/2000 |
| WO | WO 2005/106243 A1 | 11/2005 |

* cited by examiner

*Primary Examiner* — Asok Sarkar
(74) *Attorney, Agent, or Firm* — DLA Piper LLP (US)

(57) ABSTRACT

A turbine for use with a turbine generator, the turbine including at least one turbine blade for positioning in a flowpath, a hub mounting the at least one turbine blade, and a rotatable shaft in operational communication with the hub via a hinge assembly, an axis of the hub being independent of an axis of the shaft. The hinge assembly is disposed between the shaft and the hub and configured to adjust an angle therebetween. A controller assembly is configured to adjust at least one operational characteristic of the hinge assembly during turbine operation. In one embodiment the operational characteristic is a teeter angle of the hinge assembly. In one embodiment operational characteristic is a stiffness or damping force. Methods for using and controlling a fluid turbine are also disclosed.

33 Claims, 20 Drawing Sheets

| Wind Speed | Measurement 1 | Measurement 2 | Measurement n | Estimate 1 | Estimate 2 | Estimate n | Control Value 1 | Control Value 2 | Control Value n |
|---|---|---|---|---|---|---|---|---|---|
| v | $M_1$ | $M_2$ | $M_n$ | $E_1$ | $E_2$ | $E_n$ | $C_1$ | $C_2$ | $C_n$ |
| 5 | $M_{1-1}$ | $M_{2-1}$ | $M_{n-1}$ | $E_{1-1}$ | $E_{2-1}$ | $E_{n-1}$ | $C_{1-1}$ | $C_{2-1}$ | $C_{n-1}$ |
| 15 | $M_{1-2}$ | $M_{2-2}$ | $M_{n-2}$ | $E_{1-2}$ | $E_{2-2}$ | $E_{n-2}$ | $C_{1-2}$ | $C_{2-2}$ | $C_{n-2}$ |
| 22 | $M_{1-3}$ | $M_{2-3}$ | $M_{n-3}$ | $E_{1-3}$ | $E_{2-3}$ | $E_{n-3}$ | $C_{1-3}$ | $C_{2-3}$ | $C_{n-3}$ |
| .... | .... | .... | .... | .... | .... | .... | .... | .... | .... |

TURBINE AND SYSTEM FOR GENERATING POWER FROM FLUID FLOW AND METHOD THEREFOR

CROSS-REFERENCES TO RELATED APPLICATIONS

This application claims priority to U.S. Provisional Patent Application No. 61/039,003 filed Mar. 24, 2008, entitled TURBINE AND SYSTEM FOR GENERATING POWER FROM FLUID FLOW AND METHOD THEREFOR, the entire contents of which is incorporated for all purposes herein by this reference.

FIELD OF THE INVENTION

This invention relates, in general, to turbine systems and turbines for use with turbine generators, and in various embodiments to wind turbines and methods for their use.

BACKGROUND OF THE INVENTION

Conventional turbines generally extract energy from a fluid flow, such as air or water, by decreasing the speed of flow. Turbines come in varying sizes and configurations depending on the application. Some turbines are designed for small, specific applications. For example, simple wind turbine installations are used in remote locations to provide power to small communities. Independent power producers and utilities often use several larger wind turbines on a parcel of land or offshore site to generate power transmitted to a power grid. Turbines have also been used in water-based applications such as in the current flow of rivers.

Turbines and power generation projects are often subject to unique environmental and economic pressures. The size and scale of wind turbine projects in particular present several issues. Cost factors are the forefront of many turbine projects because of the delicate balance of high upfront capital costs to long-term revenues. Cost concerns involve ongoing maintenance and operation costs as well as build-out costs. The complexity and scale of wind turbines also leads to significant costs associated with transportation, capital, and labor. Large wind turbine projects also generally create additional concerns such as noise disturbances and visual impact at site locations.

In response to these concerns, there has been an increasing effort to improve performance and reduce the overall cost and environmental impact of turbines and turbine systems. Such efforts thus far have focused on cost of delivered energy, performance, material usage, system longevity and reliability, turbine blade performance and noise among other factors.

At a basic level, however, conventional turbines generally operate based on similar principles. A typical turbine includes several members, for example, blades, for engaging the fluid flow. The blades are positioned in the fluid flow and connected at a hub. The hub connects to a shaft and drivetrain assembly which then drives a generator.

Recently there has been an increased effort to improve turbine performance and address various environmental and economic issues. One focus has been to reduce the costs associated with turbines by reducing material usage, increasing performance, and increasing the operational life of the turbine. There is a constant need to reduce costs and increase performance to make cost of energy delivered from turbines competitive with other forms of energy generation.

Turbine technology has advanced rapidly to provide increasingly reliable turbines and increasingly low cost wind energy. This is partly enabled by a better understanding of the loading environment in which wind turbines operate, which enables better-designed turbines. Turbine blades, the drivetrain, and the overall operation of the turbine have been a particular focus of such cost-reduction efforts.

An exemplar of such a design change to reduce cost is a two-bladed turbine. Two-bladed turbines generally provide lower costs due to a reduction of materials, parts, and weight, which in turn means lower cost of delivered energy. Additionally, two-bladed designs offer other advantages; for example, the turbine system may be assembled on the ground and lifted all at once because of the inherent balance of a two-blade configuration.

Three-bladed designs, however, have gained greater acceptance to date than two-bladed designs. The blades on the turbine may be exposed to considerable imbalance forces, even during normal operation, which causes fatigue in the components of the turbine. Conventional systems compensate by increasing the dimensions of all the main components, which in turn negates the cost benefits of a two-bladed design. In contrast, three symmetrically arranged blades can naturally level out some of the imbalance forces created due to irregularities in the wind or water field.

Several other solutions have been presented to overcome the above design, environmental, and economic issues, and in particular to reduce imbalance forces typical of many turbines, One solution is a teetered hub. A teetered hub design includes two blades rigidly fixed to a teetered hub, which is hingedly connected to the turbine shaft.

An exemplar is U.S. Pat. No. 4,565,929 to Baskin et al. which shows a fixed pitch turbine with a hub able to passively teeter. The teetered hub can rotate through a range of motion in response to varying load forces until making contact with teeter stops. Fatigue behavior is satisfactory during normal conditions, but during extreme wind conditions with high turbulence and wind shear, the hub crashes against the teeter stops. This may result in higher moment forces than a rigid hub wind turbine.

Another solution has been developed to solve the problem of teetered movement in extreme conditions. One example is disclosed in U.S. Pat. No. 5,354,175 to Coleman et al. which discloses a passive teetered hub with an elastomeric saddle bearing, teeter stops, and hydraulic dampeners connected to each turbine blade. During normal conditions, the pre-loaded rubber provides a damping force through the range of teeter motion in accordance with the fixed elastomeric constant of the rubber.

The Coleman device has several limitations. The spring dampeners of the Coleman device apply damping pressure to the rotating blades which leads to significantly increased complexity. Further, mounting dampers to the blades may feed disturbance forces back into the blades, which would negatively affect performance and reliability. The Coleman turbine also calls for a unique dampener system associated with each blade. Each damper must be tuned to work synchronously with the other dampers. Further, the dampeners must act in coordination so as to accurately and efficiently control teeter angle and teeter dampening. The complexity of the system increases the bill of materials and maintenance costs.

Additionally, the Coleman device improves performance only in certain types of conditions. The Coleman dampeners are activated at low RPMs or when the teeter angle exceeds +/−2.5°.

A turbine is advantageously designed to cope with all conditions, whether normal power generation mode or 'other' modes including, but not limited to abnormal, extreme, non-operational, and transitions between these conditions. Examples of such conditions include quick, drastic changes in blade loading from gusts of winds, starting or stopping functions, and fault cases. The various wind turbine design and certification standards, such as the IEC standard, define the load cases that are to be considered in designs according to each standard. Such loads include fatigue loads and ultimate loads.

Conventional turbines with dampeners typically include a spring damper having a spring constant that is largely fixed and designed to be most effective during normal operation of the turbine. Such turbines allow for movement or compression of the damper during normal use, but the compression has a fixed spring constant and a certain maximum defined by an end stop or similar limit of deflection. During 'other' conditions the damper functions to dampen the approach of the teeter end limits. There is no adaptation or tuning of the system to accommodate and exploit the different dynamics of the system as a whole during operation. Additionally, the end stops may in fact increase load forces during extreme conditions when the spring damper is overcome.

It is advantageous to control teeter motion under "other" operating conditions. For example, during starting or stopping of the turbine, in particular at lower or higher wind speeds, the teeter motion is not operating under the same conditions as at the designed rotational speed of the turbine.

More recently, sophisticated mathematical and computer methods and models have been integrated into turbine designs. Such designs employ the mathematical calculations to reduce loads on the wind turbines and thus increase operational life. An exemplar of such a design is disclosed in U.S. Patent Publication No. 2004/0096329 A1 ('329 publication), now abandoned, the entire content of which is incorporated for all purposes herein by this reference. Such designs use knowledge or estimates of the operating environment to select appropriate components such as a damping member. Various aspects of the '329 publication are directed to selecting a teeter damping value based on an eigenfrequency of the operating turbine.

In spite of the above-described devices, there is a continuing need to increase the performance of turbines and the economics of turbine installation and operation.

What is needed are a turbine and system that overcomes the above and other disadvantages of known systems. What is a needed is a turbine that performs advantageously in myriad, dynamic conditions that may be experienced in real-world applications. What is needed is a turbine with increased reliability and improved efficiency (power yield) in conditions other than average or extreme fluid flow.

What is needed is a system for a turbine that minimizes the effects of imbalance forces caused by irregularities in a fluid field and thus the risk of fatigue and extreme loads in the structure and system. What is a needed is a turbine and system that minimizes the effects of imbalance forces during normal, abnormal, extreme, start/stop, non-operational, and other conditions.

What is needed is a turbine of simple design that improves operational characteristics of the turbine system based on a plurality of the factors related to the system and fluid field. What is needed is a turbine, having one or more blades, for use in a wind field or other fluid field having improved performance, reliability, and robustness.

BRIEF SUMMARY OF THE INVENTION

In summary, the present invention provides an exemplary turbine for use with a turbine generator, the turbine including at least one turbine blade for positioning in a flowpath, a hub mounting the at least one turbine blade, and a rotatable shaft in operational communication with the hub via a hinge assembly, an axis of the hub being independent of an axis of the shaft. In various embodiments the hinge assembly is disposed between the shaft and the hub and configured to adjust an angle therebetween. The invention also provides a controller assembly configured to adjust at least one operational characteristic of the hinge assembly during turbine operation. In various embodiments the operational characteristic is a teeter angle of the hinge assembly.

In certain embodiments the hinge assembly further includes a rigid hinge member mounting the hub to the shaft. The hinge member includes a coupling configured to couple a rotation of the hub to rotation of the shaft, a transverse pivot member configured to allow pivotal movement of the hinge member orthogonal to the shaft, and a damping member adjacent to the hinge member. In various embodiments the damping member is configured to apply an axial force to the rigid hinge member thereby damping the pivoting of the hinge member.

In various embodiments the hinge assembly includes a pair of damping members on opposite sides of the shaft and positioned between a front side of the hinge member and an opposing surface of the hub. The shaft optionally includes a rigid mounting surface provided along and offset from a main rotating body, and the hub optionally includes a mounting surface opposing the hinge member. In certain embodiments the hinge assembly further includes a plurality of pairs of damping members, and the hinge member includes a plurality of mounting flanges equally spaced around a central axis of the hinge member and positioned between the shaft mounting surface and hub mounting surface. Each pair of the damping members is optionally positioned on opposite sides of the mounting flange in a sandwich configuration between the flange and the rigid surfaces of the hub or the shaft. In certain embodiments the hinge assembly including four flanges and four pairs of damping members.

The invention also provides a controller configured to adjust the at least one operational characteristic during one of acceleration and braking of the at least one blade. The controller may be configured to adjust the at least one operational characteristic in response to a change in loading of the at least one turbine blade. The controller may actively adjust the at least one operational characteristic in response to changes in the flowpath upstream from the at least one turbine blade.

An exemplary controller assembly includes a control processor for processing input information and sending a control signal and a control mechanism configured to adjust the at least one operational characteristic in response to the input information. In certain embodiments the control mechanism applies a bending moment to the hinge assembly to adjust a stiffness or damping of the hinge assembly. In certain embodiments, a feedback sensor is optionally configured to measure an operational parameter of the turbine and transmit information related to the parameter to the controller as the input information. In various embodiments a feedback sensor is optionally configured to measure a parameter of an oncoming fluid and transmit information related to the parameter to the controller as the input information. The invention optionally provides one or more sensors for monitoring the turbine system. One or more of the sensors may be a forward sensor for measuring characteristics of the oncoming fluid flow. In various embodiments the forward sensor is a LIDAR sensor.

In various embodiments, the invention provides a turbine including two symmetrical blades extending from opposite sides of the hub. In various aspects of the invention the turbine is a wind turbine.

In various embodiments, the invention provides a computer program product in a computer-readable medium for adjusting a turbine, the product including instructions for receiving data related to at least one operational characteristic of the turbine and/or forward fluid field, analyzing the operation of the turbine based on the received data, and instructions to adjust another operational characteristic of the turbine based on the analyzing. In various embodiments, the turbine is a wind turbine. In various embodiments, the received data is based on at least one of the forward fluid field, teeter angle, teeter damping, yaw angle, yaw damping, and blade pitch angle. The computer program product may be used in a data processing system. In various embodiments, the analyzing is accomplished using a look-up-table. In various embodiments, the adjusting is accomplished by sending a control signal to adjust at least one of teeter angle, teeter damping, yaw angle, and yaw damping.

In various embodiments, the invention provides a data processing system for operating a turbine, the system including input means for receiving data from at least one sensor tied to a turbine, control means for controlling at least one operational characteristic of the turbine, and computing means for analyzing performance of the turbine based on the received data and computing a value for improving the performance. In various embodiments, the control means sends a control signal to adjust a hinge controller or yaw controller based on the computed value.

The invention also provides a turbine for use with a turbine generator, the turbine including at least one elongated turbine blade for positioning in a fluid field, the at least one blade mounted to a hub, a rotatable shaft in rotational communication with the hub, and adjusting means coupled to the hub and the shaft, the adjusting means configured to adjust an operational parameter of the hub or the shaft in response to changes in the fluid field during operation. In various embodiments the fluid field may be a wind field. The shaft optionally communicates with the hub via a hinge mechanism.

An exemplary adjusting means adjusts at least one of teeter angle of the hub and teeter damping of the hub, rotational velocity of the shaft, and shaft torque. The adjusting means may be a hinge controller and mechanism configured to adjust the rigidity in response to loads on the at least one blade or shaft during operation. Other adjusting means may also be provided depending on the application.

In various embodiments the invention is directed to a wind turbine system for generating energy from wind flow. The exemplary system includes a wind turbine and a wind turbine generator coupled to the wind turbine for converting rotation of the shaft to power. In certain embodiments the wind turbine includes at least one turbine blade for positioning in a wind flow, a hub connected to the at least one turbine blade along a rotational axis of the at least one blade, and a rotatable shaft in operational communication with the hub via a hinge assembly. In certain embodiments the hinge assembly is disposed between the hub and the shaft and configured to control an orientation of the hub in a direction of the wind flow. The hinge assembly includes a hinge member forming a teeter angle between the shaft and the hub. In certain embodiments the hinge member includes a damping member and having a rigidity against angular movement and a hinge controller configured to adjust the rigidity of the hinge member against angular movement. The invention also provides a hinge controller configured to adjust the rigidity in response to wind flow or loading of the at least one blade. The wind turbine system may include a generator converter system coupled to the wind turbine generator for converting the power to a form for distribution to a utility power grid.

The invention also provides a method of adjusting a turbine in a fluid flow including actively adjusting the rigidity of a hinge member in response to variations in the fluid flow.

Also provided by the invention is a damping assembly for adjustably damping a teeter of a turbine hub, the assembly including a damping mechanism configured to apply a damping force to a teetered turbine hub when positioned in a fluid flow and a controller for adjusting the damping force of the damping mechanism based on the fluid flow. In certain embodiments a torque controller is optionally provided for adjusting a torque of a rotating shaft of the turbine. The torque controller adjusts the torque based on the damping force. In certain embodiments a blade pitch controller is optionally provided for adjusting a pitch angle of a turbine blade of the turbine. The blade pitch controller adjusts blade pitch based on the damping force.

In various aspects, the invention provides a method of operating a fluid turbine positioned in a fluid flow, the method including receiving, from a first sensor, during one or more first time periods, event data with respect to one or more events sensed from the first sensor, identifying, using a look-up-table, a set of operational parameters of the turbine that correspond to the event data, computing for at least a portion of the operational parameters in the identified set a performance value that is a function of the operational parameter, determining for the computed portion of the identified set a parameter score for each operational parameter based on the computed performance value, ranking the operational parameters in accordance with the parameter scores, selecting one of the operational parameters based on the ranking, and adjusting one of teeter damping and teeter angle based on the selected operational parameter. The invention also provides determination means for the controller assembly to determine an output signal based on received input information. In certain embodiments, the controller assembly adjusts an operational characteristic of at least one component of the system, for example, the hub teeter damping, based on the input information.

Various aspects of the invention are directed to a yaw system for orienting a turbine in a flowpath, the system including a yaw controller for positioning a turbine having at least one rotatable turbine blade in a flowpath relative to a reference angle about a yaw axis; a monitoring assembly for measuring a material characteristic of at least one of the blades; and a yaw processor for identifying a yaw error based on information related to the measured characteristic.

In various embodiments, the monitoring assembly measures at least one of load, stress, strain, and temperature in the at least one turbine blade. The monitoring assembly may measure a frequency of a natural mode of the at least one blade based on a plurality of measured material characteristic values during a time period. In various embodiments, the yaw processor calculates a coefficient of an algorithm for a discrete Fourier transform (DFT) representing the natural mode frequency of the at least one blade. The yaw processor may identify the yaw error based on the coefficient exceeding a predetermined value. The yaw error may relate to a deviation from the reference angle and/or extreme direction change. The yaw error may be identified based on a comparison of lift forces in opposing blades. The yaw error may be identified based on an inequality of forces in the opposing blades when the blades are in a position parallel to a ground reference plane or rotating from the parallel position.

In various embodiments, the yaw controller is configured to change a yaw angle based on the yaw error identification. In various embodiments, the yaw controller generates a shutdown signal in response to the identification of yaw error. The yaw controller may be a passive controller.

In various aspects of the invention, the yaw system further includes a pitch controller for adjusting a pitch angle of the at least one blade, wherein the pitch controller is configured to change the pitch angle based on the change in yaw angle. The turbine may be a variable speed turbine and a speed of the turbine is adjusted based on the change in yaw angle of the turbine.

In various embodiments, the yaw controller is configured to allow a yaw angle of the turbine to freely change. In various embodiments, the yaw controller is configured to dampen yaw movement. In various embodiments, the yaw system further includes a yaw brake.

In various embodiments, the monitoring assembly is a sensor array positioned on the at least one turbine blade. Each of the sensors may measure one of edgewise strain and flapwise strain. At least one of the sensors may be a fiber optic strain sensor. The sensors may be positioned at a root end of the at least one blade proximate an axis of rotation.

In various embodiments, the yaw system further includes a memory for storing historical data from the monitoring assembly. The yaw processor may be configured to filter out turbulence data based on the stored historical data. The yaw processor may be calibrated to reduce the affects of at least one of normal operating temperature, weight of the at least one blade, and centrifugal force.

In various embodiments, the yaw system further includes a sensor for monitoring wind conditions, wherein data related to historical wind conditions is stored in the memory, further wherein the yaw processor is configured to filter out wind turbulence data based on the stored wind conditions data.

Various aspects of the invention are directed to a method of generating power from a wind turbine, the method including providing a wind turbine including at least one rotatable turbine blade positioned in a flowpath, a yaw controller for positioning the at least one turbine blade in the flowpath relative to a reference angle about a yaw axis, and an electrical power generating system for providing power to a power grid by rotation of the at least one turbine blade in the flowpath; positioning the turbine in the flowpath; activating the electrical power generating system; collecting energy from electrical power generating system; monitoring a loading characteristic of the at least one turbine blade; and determining a yaw error based on the monitoring. In various embodiments, the yaw error relates to a deviation from the reference angle and/or extreme direction change. In various embodiments, the method further includes adjusting a yaw angle of the turbine in response to a determination of yaw error. In various embodiments, the method further includes deactivating the electrical power generating system in response to a determination of yaw error.

In various embodiments, the monitoring includes measuring at least one of stress, strain, temperature, and load force. In various embodiments, the method further includes repeating the monitoring, wherein the determining includes computing a frequency of a natural mode of the at least one blade based on the plurality of monitored loading characteristic values. The determining may involve calculating a coefficient of an algorithm for a discrete Fourier transform (DFT) representing the natural mode frequency.

In various embodiments, the method further includes, before the determining, selecting a predetermined threshold value, wherein the determining involves identifying yaw error based on the coefficient exceeding the predetermined value.

In various embodiments, the wind turbine includes an even number of blades, wherein the determination of yaw error is based on identifying an inequality of forces in opposing blades. The wind turbine may include an even number of blades, each blade including a leading edge and a trailing edge, wherein the determination of yaw error is based on identifying an inequality of wind speed at the leading edge of opposing blades.

In various embodiments, the method further includes the step of storing data related to the monitoring over a period of time. The determining at a moment in time may be based on a comparison to previously-stored data. The determining may be based on a predetermined algorithm related to the previously-stored data.

Various aspects of the invention are directed to a wind turbine system including a tower, at least one rotatable turbine blade supported on the tower and configured for positioning in a flowpath, at least one sensor positioned on the at least one blade, the sensor configured to monitor a material characteristic of the at least one blade, and a yaw controller configured to adjust a yaw angle of the at least one turbine blade about a longitudinal axis of the tower, wherein the yaw controller is configured to detect yaw error based on a signal including information related to the material characteristic.

In various embodiments, the yaw error relates to a deviation from the reference angle and/or extreme direction change. The yaw controller may determine yaw error, and the yaw controller adjusts the yaw angle. When the yaw controller determines yaw error, braking force may be applied to the at least one turbine blade.

In various embodiments, the system further includes a shaft in communication with the at least one turbine blade, the shaft being rotatable about a rotational axis, a drivetrain in communication with the rotatable shaft, and a generator coupled to the drivetrain and configured to convert a rotation of the drivetrain into electrical power. In various embodiments, the yaw controller transmits a yaw error signal to the generator in response to detection of yaw error, the generator being configured to power down in response to the yaw error signal. The yaw controller may transmit a yaw error signal to the generator in response to detection of yaw error, further wherein the generator is configured to adjust speed in response to the yaw error signal.

Various aspects of the invention are directed to a method of controlling a turbine similar to those described above and implemented on a computer. Various aspects of the invention are directed to a computer program product in a computer-readable medium for use in a data processing system for operating a wind turbine, the computer program product including instructions for receiving data related to at least one component of the turbine, instructions for comparing the data to predetermined values, on the basis of the comparing, determining an adjustment factor, and transmitting the adjustment factor. The adjustment factor may be transmitted to a controller that adjusts a component of the turbine in response to the same.

Various aspects of the invention are directed to a data processing system for operating a wind turbine including input means for inputting data.

The turbine and system of the present invention has other features and advantages which will be apparent from or are set forth in more detail in the accompanying drawings, which are incorporated in and form a part of this specification, and the following detailed description of the invention, which together serve to explain the principles of the present invention.

BRIEF DESCRIPTION OF THE DRAWINGS

FIGS. 18A, 18B, and 18C are exemplary diagrams of look-up-tables used by the controller of the turbine FIG. 1 in accordance with the present invention.

DETAILED DESCRIPTION OF THE INVENTION

Reference will now be made in detail to the exemplary embodiments of the invention, examples of which are illustrated in the accompanying drawings. While the invention will be described in conjunction with various embodiments, it will be understood that they are not intended to limit the invention to those embodiments. On the contrary, the invention includes alternatives, modifications and equivalents, which may be included within the spirit and scope of the invention as defined by the appended claims.

Figure 1:
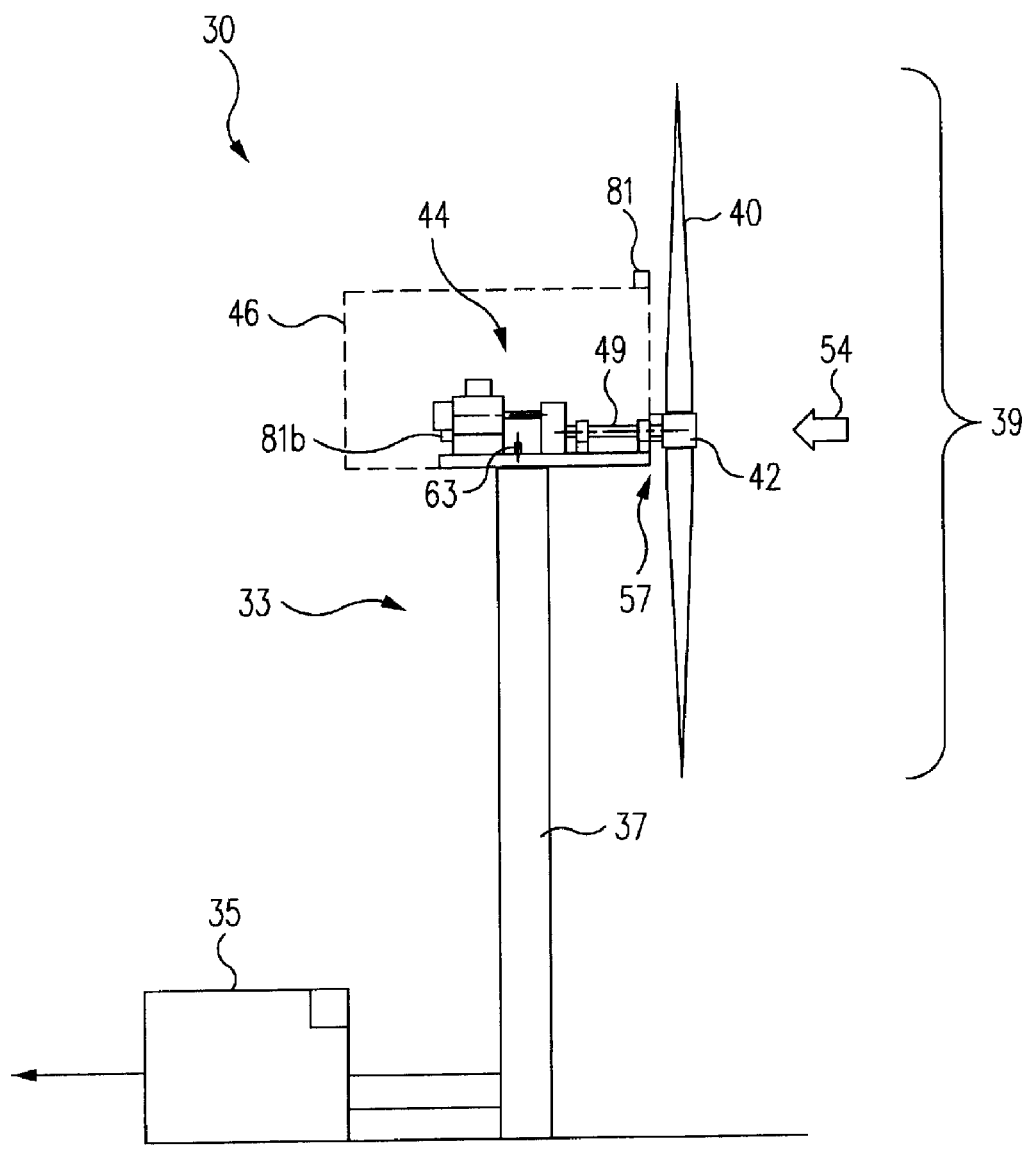
FIG. 1 is a side view of wind turbine system including a two-bladed turbine in accordance with the present invention.

Turning now to the drawings, wherein like components are designated by like reference numerals throughout the various figures, attention is directed to FIG. 1, which illustrates an exemplary wind turbine system, generally designated 30, on a surface 32 such as the ground. Exemplary system 30 includes a turbine 33 and generator 35 supported by a tower 37. Although the embodiment described applies to a wind turbine, the principles described below may be applied equally in accordance with the present invention to turbines for other fluids including, but not limited to, water and gas and other applications and site locations.

Turbine 33 is similar to the one disclosed in U.S. Patent Publication No. 2004/0096329 A1, entitled System For A Turbine With A Gaseous Or Liquideous Working Medium, now abandoned, the entire content of which is incorporated herein for all purposes by this reference.

In operation, exemplary turbine 33 is positioned in a wind field 39. The wind field refers to the aggregate or set of wind vectors crossing the area swept by the turbine. The wind vectors passing through the swept area generally are not identical. Further, the wind vectors passing through a particular point in the swept area vary with time. Therefore, the wind field, or fluid field in the case of other turbines, represents a complicated, dynamic set of force vectors.

The fluid field includes at least two components. First, the fluid field generally includes a systematic variation, referred to generally as fluid shear, which means that the mean fluid speed is higher during the upper part of the revolution of the blade sweep than the lower part. Second, the fluid field generally includes a stochastic variation, referred to generally as turbulence. The fluid shear creates one load cycle for each revolution of the turbine in a co-rotating system of coordinates. The tower shadow, which is defined as the fluid stream that is disturbed by the tower, may create similar variations.

Referring to FIGS. 1-2, exemplary turbine 33 includes two elongated turbine blades 40 positioned in flowpath 39. Although the turbine is illustrated with two blades, the turbine may be equipped with any number of blades depending on the factors of the turbine application such as weight concerns, size and rotational speed of the turbine, fluid flow conditions, and material cost factors.

The turbine blades are adapted to harness the energy of the fluid flow. The operational communication of turbine blades 40 with generator 35 defines an operational stream whereby energy is transferred from the blades to a drivetrain assembly and eventually to the generator. The power can be transferred by various means including, but not limited to, mechanical means such as a drivetrain shaft or electrical means by translating the kinetic energy of the blades to electrical energy.

It should also be noted that the blade configuration may further be adapted depending on the application. For example, the shape of the blade may be altered to increase blade efficiency. The blade surface is generally shaped such that the wind or fluid flow in which it is positioned drives rotation of the blade. In one embodiment the blade is adapted for a particular fluid type or characteristic. The blade shape may also be configured with other factors in consideration such as moment, axial forces, and bending forces; rotational design speeds; and noise. The blade configuration may be altered in other manner as would be understood by one skilled in the art from the foregoing.

Turbine blades 40 are connected to a hub 42 along a rotational axis of the blades. Alternatively, the blades may be connected in other configurations directly or indirectly to the turbine shaft depending on the application. In one embodiment the hub is a cap that forms a rigid connection between the blades and fastens to the a rotating shaft. Hub generally refers to the distinct member that communicates the motion of the rotating blades to a drivetrain assembly 44. The hub may also be integrated or monolithically formed with the blades or the rotating shaft.

Turbine 33 is adapted for teetering of the rotating blades in response to different events or to positively adjust or tune the operation of the turbine and blades 40 in wind field 39 for increased performance. The means for adjusting the teetering function and tuning other similar component functions may be integrated with hub 42.

The rigidity of the hub makes the hub a suitable member for teetering and other such adjusting functions. In contrast to other devices, the turbine of the present invention has a simple, rigid, and efficient structure in part by virtue of the use of the rigid hub as a base for adjustment functions.

Although adjustment may be provided through the turbine blades, the hub may provide a more suitable load-application location in some applications because forces applied to the blades may affect blade performance absent countervailing factors. Applying forces to the blades may also amplify imbalances which then reverberate back into the system.

As will be described below, the hub structure and hinge assembly of the present invention may be configured for performing a variety of tuning functions.

In one embodiment the stiffness and/or damping of the hub teeter is tuned. Although used interchangeably, stiffness and damping are slightly different. Stiffness refers to resistance to movement and damping refers to absorbing bursts of energy or deadening, such as against abrupt jerks and shock to the system. In one embodiment the hinge assembly can be adjusted for one or both of these functions.

Turning to FIGS. 1-2, turbine system 30 includes a turbine 33 housed within a nacelle 46 and mounted on top of tower 37. The turbine is connected to a generator 35 which produces power from the rotation of a turbine shaft 47. In one embodiment the generator transmits power to a converter and power grid (not shown).

With particular reference to FIG. 2, shaft 49 and a hinge assembly, generally designated 57, are positioned downstream from the hub. In one embodiment, the hinge mechanism 58 of the hinge assembly is configured as a pivot or joint in which two members move about an axis. The hub and blades on one side of the hinge pivot in relation to the rotatable shaft. An axis of the hinge thus forms the teeter axis. As illustrated in FIG. 2, the hub angle is determined in part by the tilt angle from the horizon or transverse axis, designated 49.

Teetering refers broadly to a tilting of a plane formed by the sweep of blade 40 relative to angularly fixed members such as the shaft or tower 37. Teeter angle refers to an angle between a plane normal to an axis 51 of the shaft and the plane formed by the sweep of the blade. The hinge thus determines a teeter angle α of the hub and blades. Teeter generally refers to the tilt of the hub and rotating blades relative to the rest of the turbine and tower, but in some applications teeter may also refer to tilting relative to the oncoming fluid flow or with reference to other components. For example, the shaft may be non-rigid or non-linear in which case teeter angle may be based on reference to another component.

Turning to FIGS. 3-12, turbine 33 includes turbine blades 40 positioned in flowpath 54, hub 42, and drivetrain 44. The drivetrain consists of a shaft 49 connected to the hub at one end, a gearbox, and any other components between the blades and generator 35. The turbine hub and blades are mounted to the shaft to allow for teeter movement. In one embodiment, the shaft is in operational communication with the hub via a hinge assembly 57. Other configurations may also be employed to mount the rotating blades for teetering relative to the shaft.

Hinge assembly 57 allows for the hub to be oriented at an angle relative to the shaft such that an axis of the hub is independent of an axis of the shaft. Hinge assembly 57 is disposed between the shaft and the hub in a functional line of the turbine and is configured to adjust an angle α therebetween (best seen in FIG. 2). The angle α is referred to as a teeter angle. The hinge assembly includes a hinge mechanism 58 and control mechanism 69. In one embodiment the hinge mechanism is a simple pivot coupling the shaft to a rod extending from the hub along the axis of rotation of the hub. While the hinge assembly is disposed entirely between the hub and shaft both physically and operationally in the illustrated figures, other configurations may be employed depending on the application. Portions or specific components of the hinge assembly may be between the shaft and hub while others are not.

Turbine 33 further includes a controller assembly 56 configured to adjust at least one operational characteristic of the hinge assembly during turbine operation. The controller assembly includes at least one control mechanism 69 and a controller unit 53. The control mechanism is configured to act on hinge mechanism 58 in response to a control signal from the controller.

As will be described in greater detail below, the controller assembly is adapted to adjust hinge assembly 57 based on at least one of several factors including, but not limited to, changes in the fluid field during operation, operational parameters, and the like. In one embodiment the hinge controller tunes the stiffness of the hinge to optimize damping of teetering of the hinge such that power yield of the turbine is increased.

Hinge mechanism 58 has a teeter range defined as a teeter angle α range through which hub 42 may rotate based on the controller assembly. In one embodiment the teeter range is fixed within a range of about −20° and about 20°. In one embodiment the teeter range is less than +/−5° off center. The hinge assembly may include optional teeter blocks (not shown) to stop the teetering of the hinge mechanism. The teeter blocks may be of an elastic material such that the force of the hinge mechanism hitting the blocks is absorbed. In various embodiments a damping member 65 is provided to damp teeter of the hinge and also to apply a biasing force against the hinge mechanism thereby keeping it within a predetermined range of motion.

The motion of the teeter system may be dependent upon many factors. In various embodiments, the hinge controller takes into account the 1-p (one per revolution) oscillation brought about largely by vertical wind shear. Incident wind speed generally varies across the rotor disk. As each blade sweeps through incident wind speed, the speed is generally lower at the lower azimuthal position (i.e. blade downwards) and higher at the upper azimuthal position (i.e. blade upwards). Thus, the hinge controller, and the yaw controller as discussed below, may account for such variations in wind speed. In various embodiments, the controller(s) take into account the stochastic variation of wind speed added to this general wind flow. The length scale of turbulence may be such that successive blades sample (i.e. pass through) turbulence more than once. In general, the result of the above factors to influence the conditions for a fundamental oscillation of the teeter system at 1-p.

The rotation of the blades may be used to determine how to control the turbine in other manner as well. With a turbine have two opposing blades, one will appreciate that the blades largely experience identical conditions in an ideal environment. For example, in a homogenous wind field, when the blades are horizontal, the blades will experience the equal, but opposite forces. One blade will be moving up while the other is moving down, but both will experience the same wind speed in the sweeping direction. The system may be configured to monitor the operating conditions based on these principles and dynamically adjust the various components accordingly. In various embodiments, the turbine includes a processor for detecting differences in forces on the blades as they pass horizontal and transmitting a control signal to adjust a characteristic of a component of the turbine in response.

In one embodiment the hinge is adjusted to maintain fatigue loads on components or the system as a whole within predefined ranges. For example, the controller assembly may increase the stiffness or damping force of the hinge mechanism when a relatively large increase in wind speed is detected in front of the turbine to avoid the hub from abruptly snapping or changing directions from one side to another side or crashing or bottoming out at the teeter limit of the hinge assembly. The controller assembly may also be configured to progressively—linearly, exponentially, or otherwise—increase the stiffness and damping of the hinge mechanism such that the force of the hinge mechanism bottoming out at the maximum teeter range is reduced or eliminated.

Controller 53 may be configured or programmed to adjust the hinge mechanism in other similar manner as will be understood by one skilled in the art from the description herein. As will be described further, controller assembly 56 may adjust the hinge assembly for several purposes and under myriad operating conditions. In its life, the turbine system will generally function in a normal operating phase in which case the fluid flow is within expected ranges and the turbine system is generally in power-generating mode. However, the turbine system will also experience non-operating conditions. For example, during critical conditions such as high gusts and violent, turbulent flow, it may be desirable to adjust the turbine system for safety and to preserve the system. Other modes include, but are not limited to, start-up and shut-down in low winds, freewheeling, braking, park, safety system shutdown, loss of grid shutdown, yaw error shutdown, and emergency stop shutdown. Among other things, the controller assembly may be configured to adjust an operational characteristic of the hinge assembly in view of promoting operation of any of these tasks, increasing power yield in any of these conditions, or both.

In various embodiments, the hinge controller is configured to adjust the stiffness of the hinge assembly during the "other" condition. As the blade passes through the azimuthal position and wind such that the teeter system moves "towards" an damping member, the hinge assembly is fixed in a desired position while the damping member is compressed and load increases. The hinge controller may additionally be arranged to be capable of applying a sufficient force to overcome this forces on the damping member. In various embodiments, during activation and control of the hinge controller, the motion of the hinge controller is arrested prematurely during that part of the blade azimuth and teeter system motion.

The controller assembly 56 may also be configured to adjust operational characteristics of other system components alone or in coordination with hinge assembly 57. In one embodiment the controller assembly applies a braking or accelerating force to the shaft or hub to adjust the rotational speed. The torque on the shaft or generator may also be similarly adjusted. Because the controller assembly and hinge assembly are operationally integrated with the shaft in one embodiment, the operation of the hub and shaft can easily be adjusted by the controller assembly as would be understood by one skilled in the art from the description herein. However, adjustments to the shaft operation may depend on generator type, for example, some variable slip induction generators may be designed for fixed rotational speed and/or torque. In one embodiment the turbine system includes blade controlling means configured to adjust blade pitch in coordination with adjustments to at least one of the hinge member and shaft adjustments.

Figure 2B:
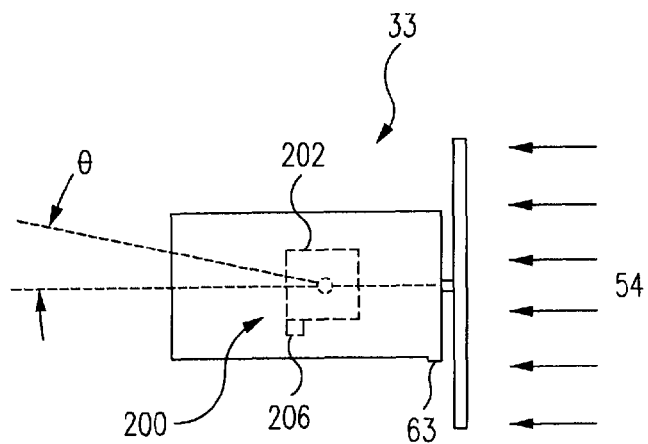
FIG. 2B is a top view of the wind turbine system of FIG. 1, illustrating a yaw angle of the turbine.
Figure 2A:
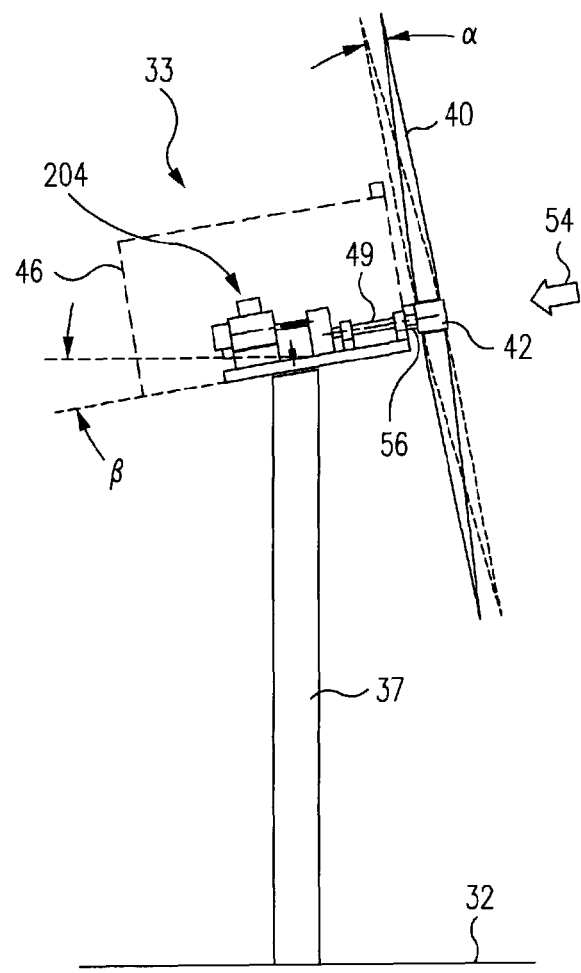
FIG. 2A is a side view of the wind turbine system of FIG. 1, the system illustrating a teeter angle of the hinge assembly and a tilt angle of the turbine nacelle.
Figure 3:
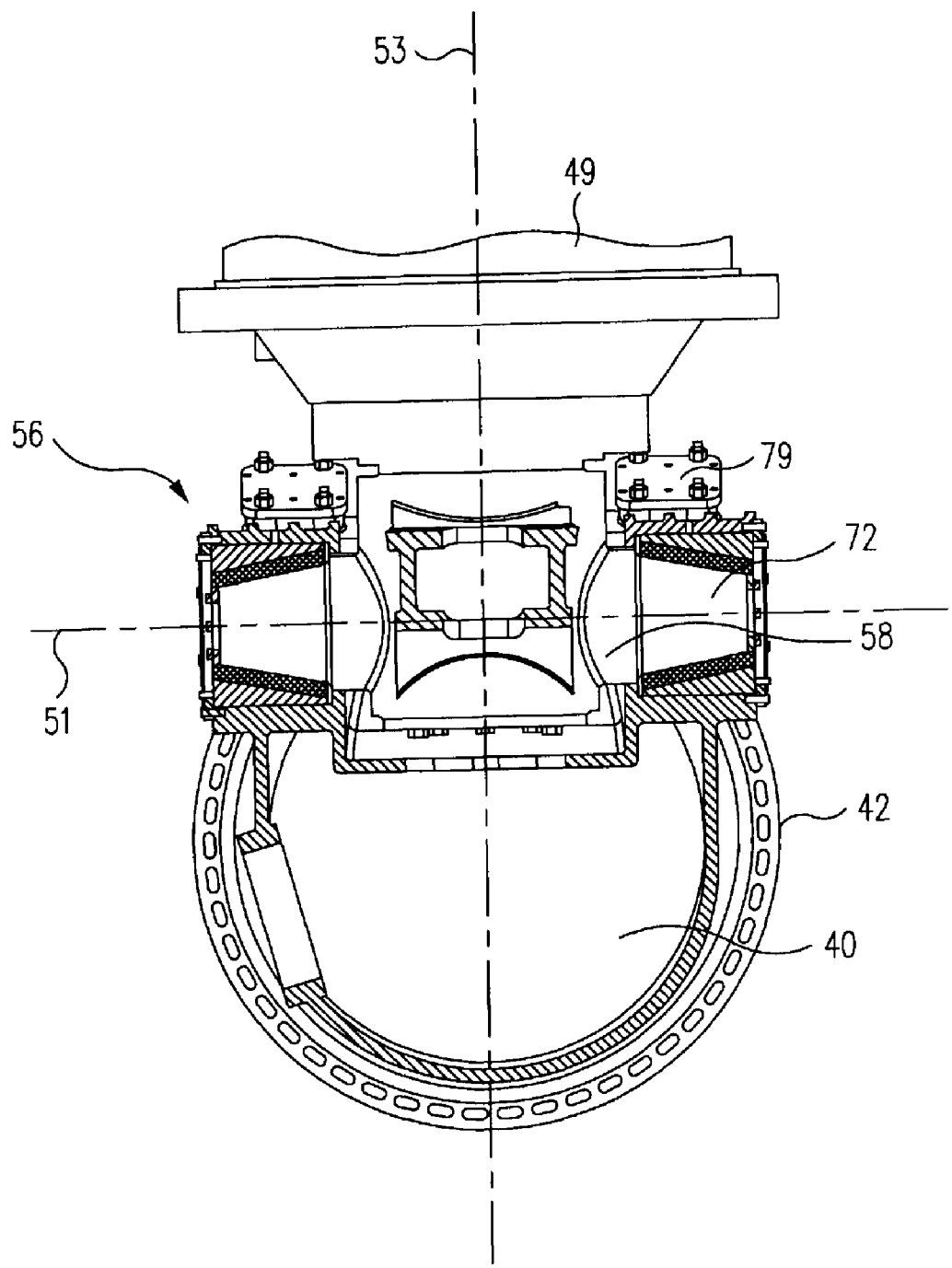
FIG. 3 is an enlarged side view, partially sectional, of the hinge assembly and hub of the turbine of FIG. 1.
Figure 4:
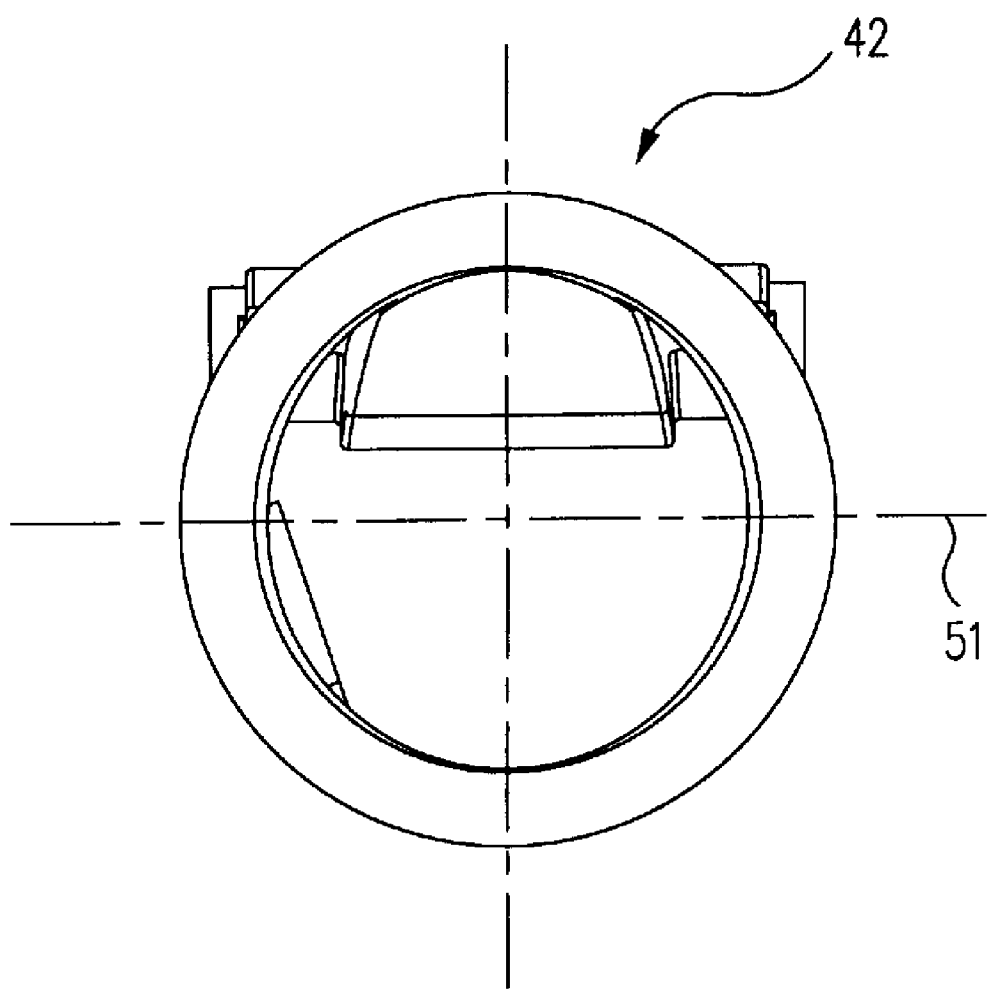
FIG. 4 is an enlarged front schematic view of the hinge assembly and hub of the system of FIG. 1.
Figure 5:
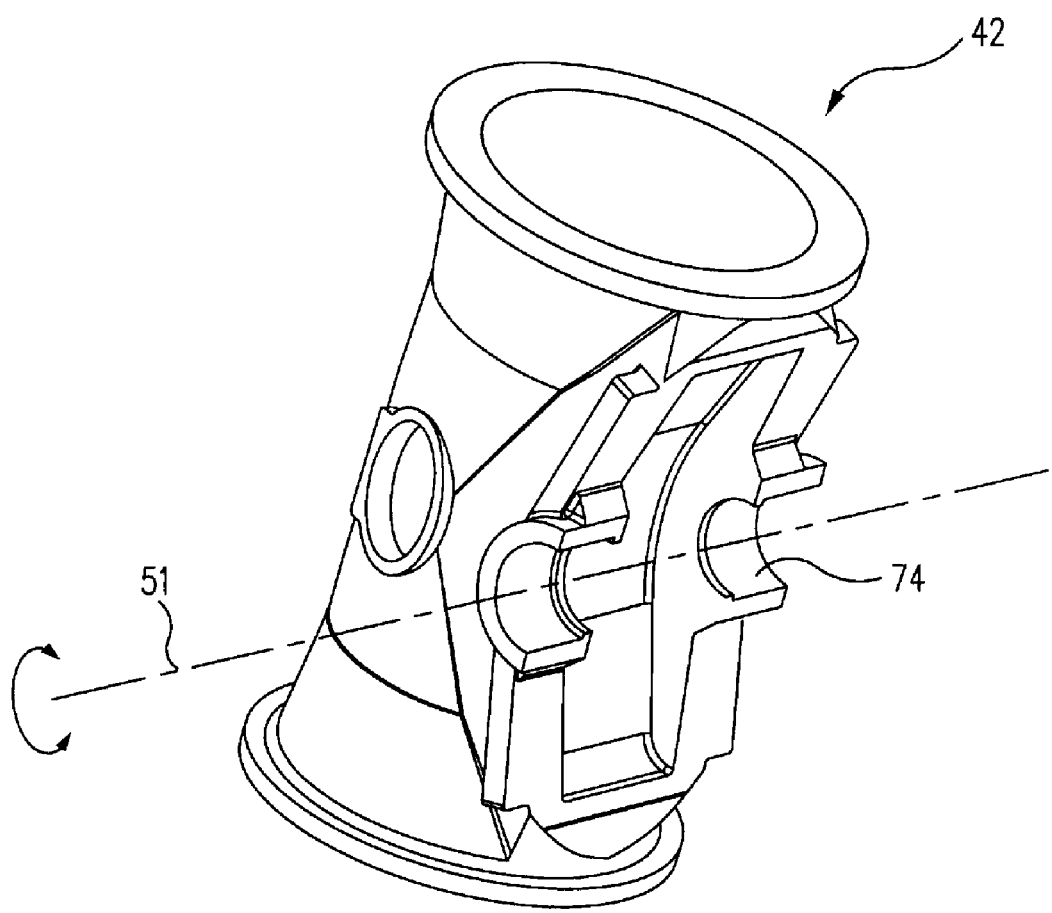
FIG. 5 is an enlarged perspective view of the hub and an integrated portion of a hinge assembly of the turbine of FIG. 1.
Figure 6:
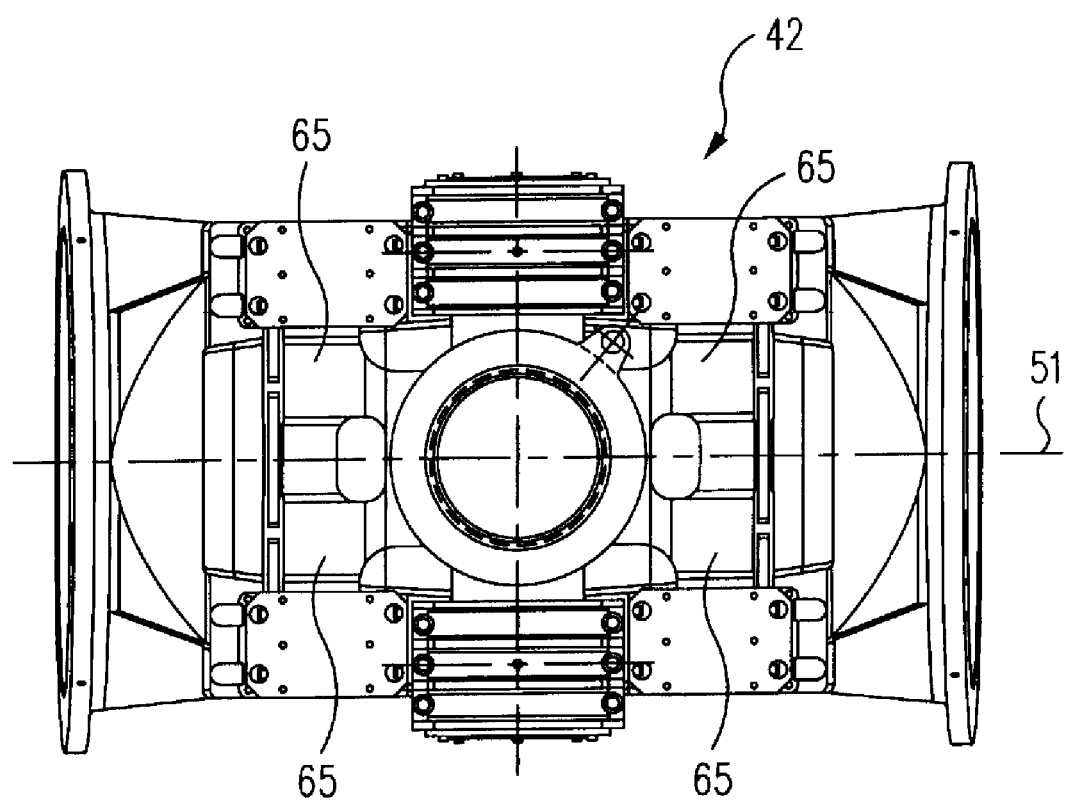
FIG. 6 is an enlarged rear view of the hub of FIG. 5.
Figure 7:
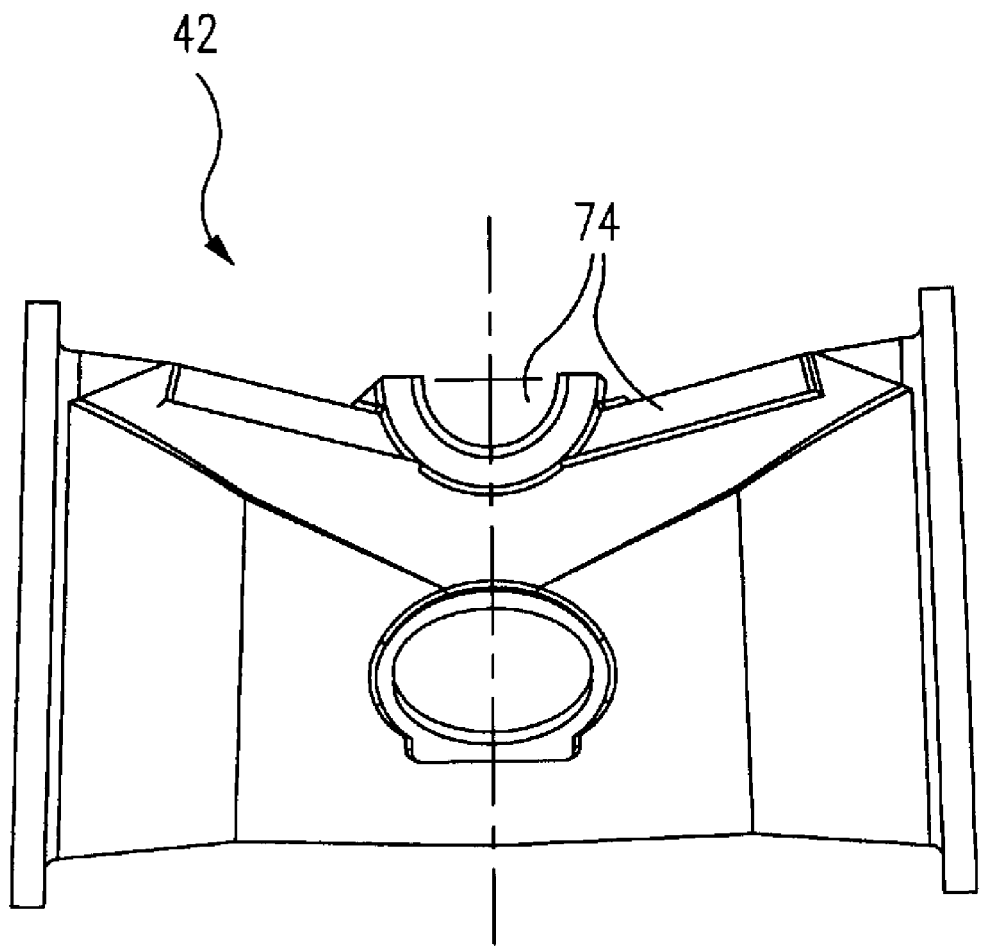
FIG. 7 is an enlarged side view of the hub of FIG. 5.
Figure 8:
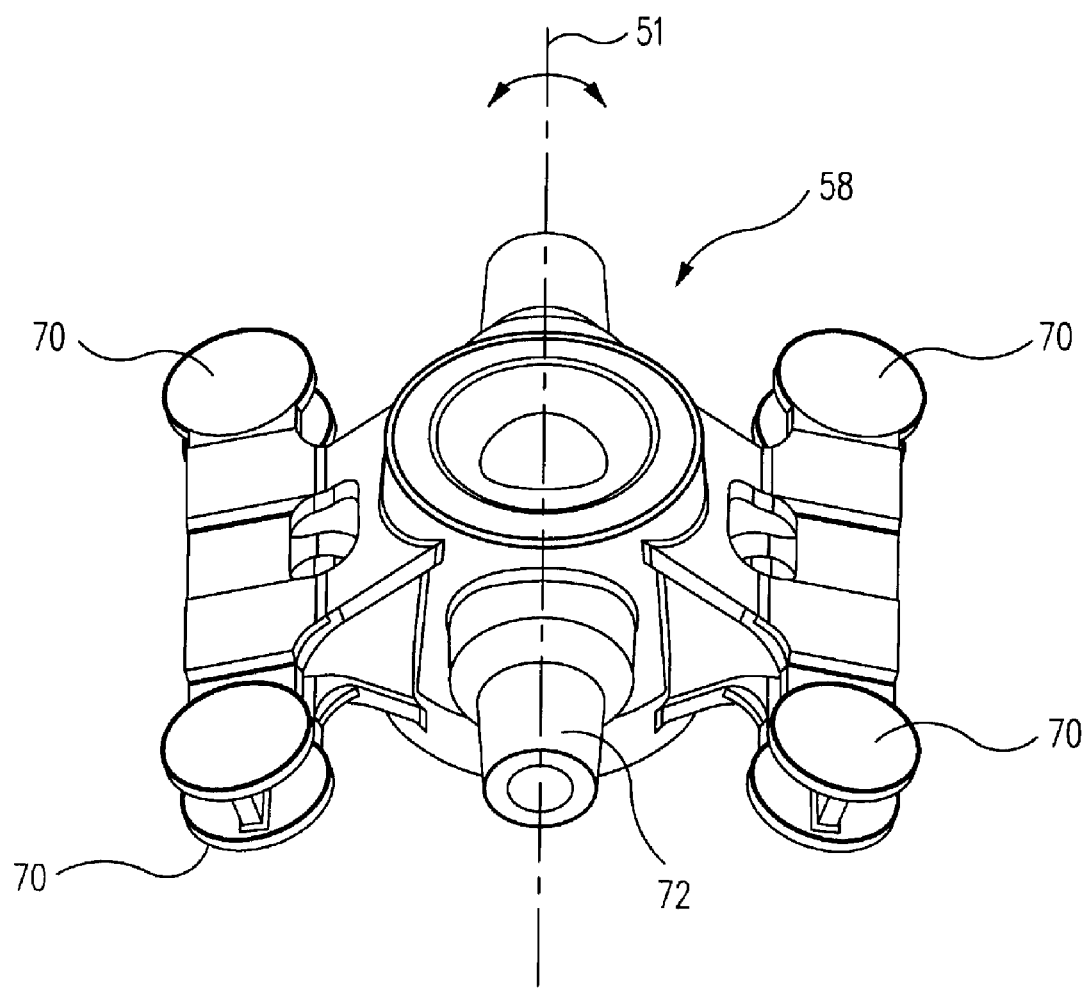
FIG. 8 is an enlarged perspective view of a hinge plate of the turbine of FIG. 1.
Figure 9:
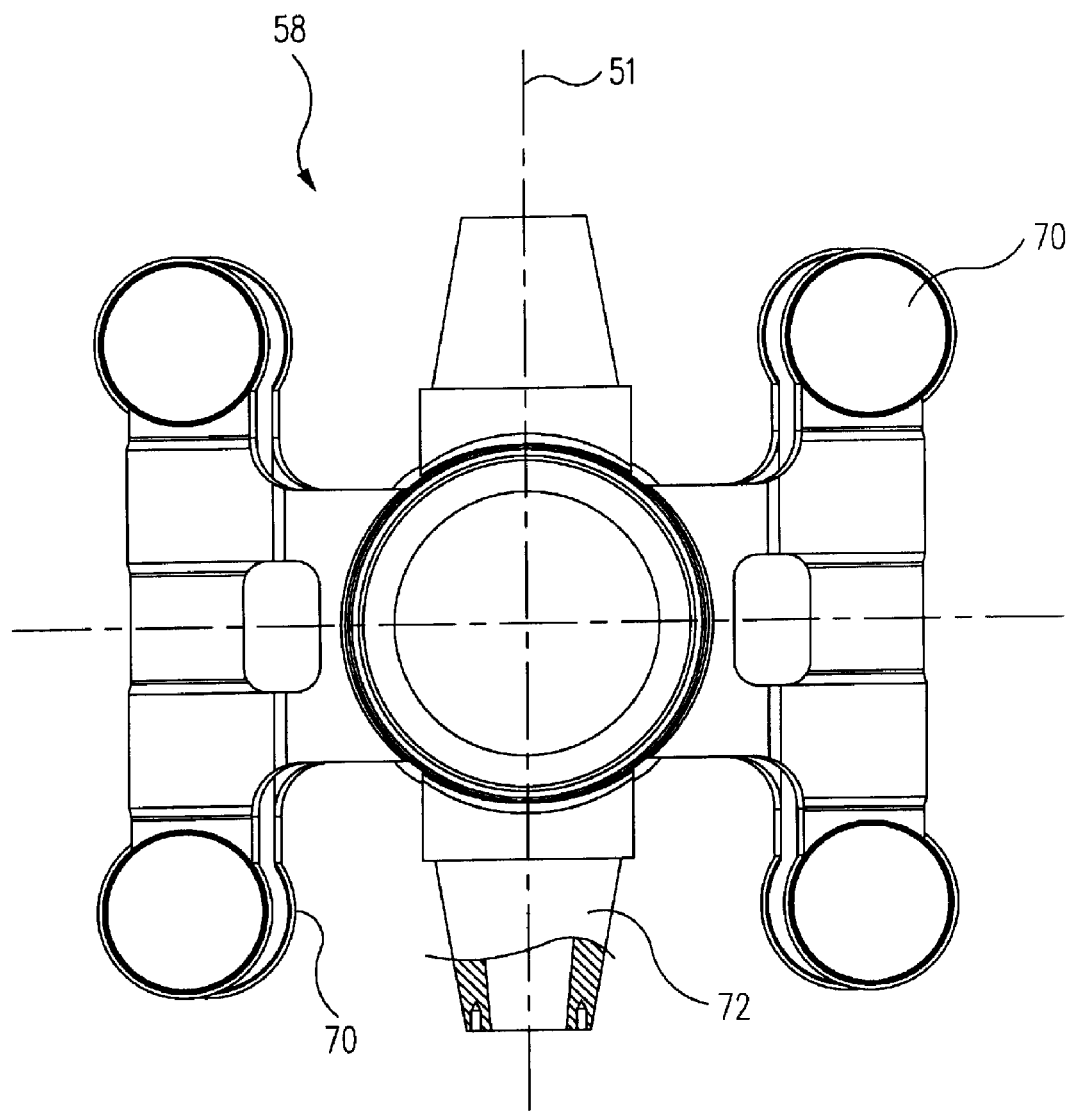
FIG. 9 is an enlarged top view of a hinge plate of the turbine of FIG. 1.

Referring more specifically to FIGS. 1, 2A, and 2B, turbine nacelle 46 is mounted on top of tower 37. The tower is an elongated vertical tower. An angle between a central axis of the tower and shaft axis 51 in a vertical plane determines a tilt angle $\beta$ (best shown in FIG. 2A). In various embodiments, the tilt angle is maintained between about 4 degrees and about 5 degrees from horizontal. In various embodiments, the tilt angle is fixed at an angle between about 4 degrees and about 5 degrees.

A yaw angle $\theta$ (best shown in FIG. 2B) is defined by the direction of rotating turbine blades in the flowpath relative to the tower axis.

In various embodiments the tower height is 60 meters and has a frustoconical shape with a top diameter of 2 meters and bottom diameter of 3 meters. The nacelle without the turbine is approximately 50 metric tons and the turbine is nearly 50 tons. Suitable materials for the tower include, but are not limited to, steel and composites. In one embodiment the tower is 45 metric tons and hardened steel. Thus, the tower and nacelle may exert substantial gravitational loads compounded by the interaction with the fluid flow.

In various embodiments the turbine includes a yaw control system 200. The yaw control system includes a yaw controller 202, monitoring assembly 204, and yaw processor 206. The yaw controller is configured to control the yaw angle of the turbine and blades in the fluid flow. In various embodiments, the monitoring assembly includes sensors 81. At least one sensor may be mounted on the blade, between the hub and the outer tip, to measure loads on the blade. The yaw processor is configured to detect a yaw error based on the data received from the monitoring assembly.

In various embodiments, the processor uses the data from the monitoring assembly to compute a frequency of a natural mode of the blade. Based on knowledge of the historical turbine performance, material data, turbine parameters, and other information, a normal range for the process parameters may be determined and input into the processor. The processor can then determine yaw angle based on a parameter exceeding the normal range. In various embodiments, yaw error is detected based on a significant deviation from a reference angle and/or an extreme direction change (EDC). One will appreciate from the description herein that the yaw controller, similar to the hinge controller, may be modified based on the desired application.

In various embodiments, the yaw processor takes into account known information about the turbine components and/or incorporates information based on historical performance. The yaw processor may be calibrated to reduce the affects of at least one of normal operating temperature, weight of the at least one blade, and centrifugal force. For example, because the weight and dimensions of the blade are known and the rotational speed may be monitored, one can predict the centrifugal force and centrifugal stiffening. The yaw controller can then be adjusted to account for this centrifugal stiffening factor. This can be done for in-plane and out-of-plane forces.

More information related to the mathematics for accounting for centrifugal forces and the like may be found in the Wind Energy Handbook by Burton, Sharpe, Jenkins, and Bossanyi (Wiley 2001), incorporated herein for all purposes by reference. A more simplified method that includes centrifugal stiffening in the calculation of the first mode flapwise eigenfrequency for a fixed, non-teetered blade is the Southwell formula, incorporated herein for all purposes by reference.

One skilled in the art will appreciate that yaw controller may account for myriad static and dynamic variables relating to the components and operation of the turbine system. The controller may be calibrated to account for known factors. The controller may also be dynamically adjusted based on received input from the sensors and other components. The hinge controller and other aspects of the turbine may be also adjusted in similar manner. In various embodiments, the turbine includes a plurality of controller configured to dynamically adjust respective components. In various embodiments, the controllers are operated in coordination with each other whereby information from one controller is transmitted to other controllers.

Turning to FIGS. 1-11, hinge assembly 57, via hinge mechanism 58, may be configured to positively adjust teeter movement of hub 42 and blades 40 to improve performance or reduce fatigue loading. The hinge assembly includes a damping assembly 65a for damping teeter movement of the hub and blades. Damping refers to adjust of movement including, but not limited to, oscillations, amplitude of movement, and velocity of movement. Additionally, the hinge assembly may also be configured to guide or positively orient the hub relative to the rest of the turbine or relative to the fluid flow. For example, the controller assembly may apply a sufficient force to positively move the hinge assembly to a desired teeter angle if the wind flow shifts directions.

The hinge assembly further includes damping mechanism 65 configured to apply a damping force to teetered hub 42 when it is positioned in a fluid flow. In one embodiment, the damping force is applied indirectly through hinge mechanism 58. In one embodiment the hinge assembly applies a damping force in part or entirely to the hub.

Figure 10A:
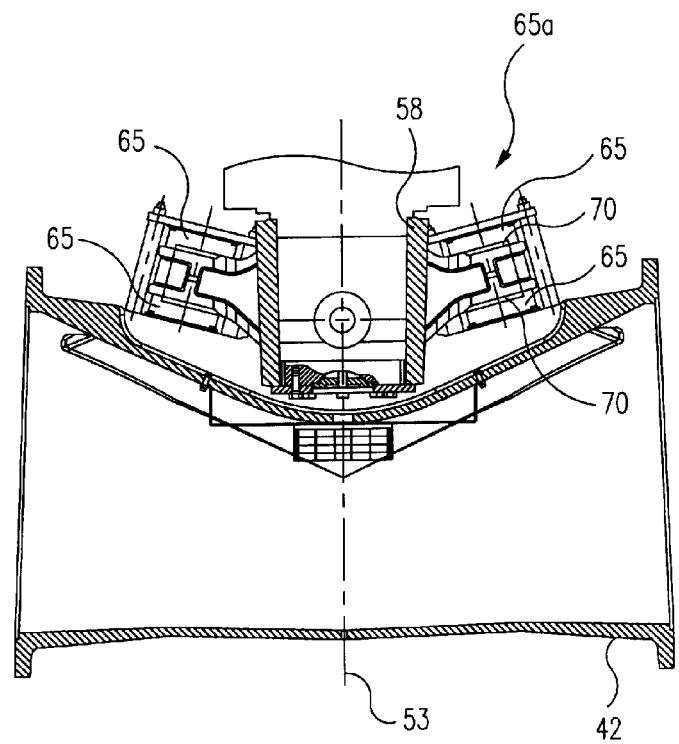
FIG. 10A is an enlarged cross-sectional, top view of the hinge plate of FIG. 8.
Figure 10B:
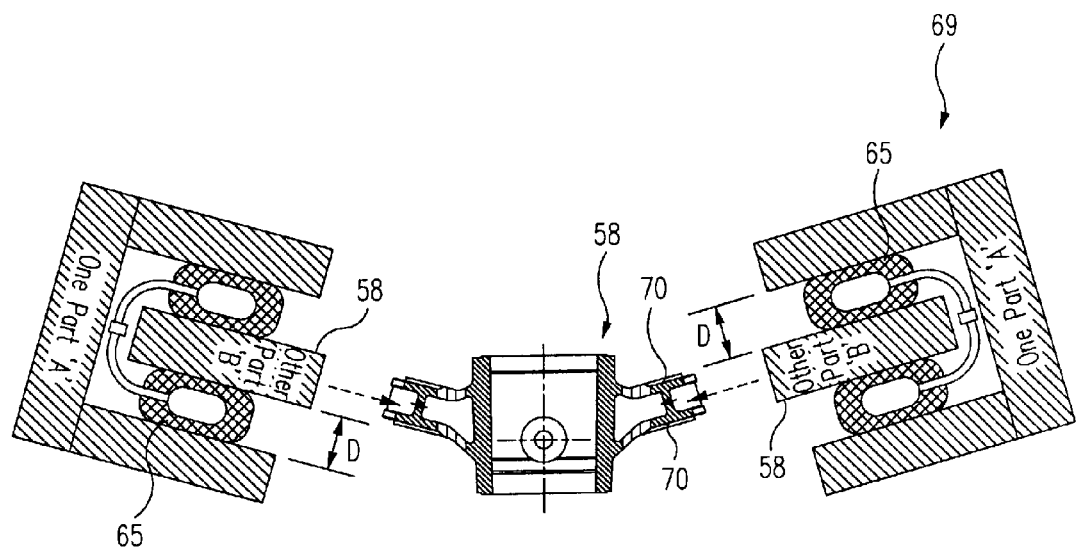
FIG. 10B is an enlarged view of the hinge assembly including the hinge plate of FIG. 11A and controller mechanism for use in the exemplary turbine of FIG. 1 in accordance with the present invention.
Figure 11:
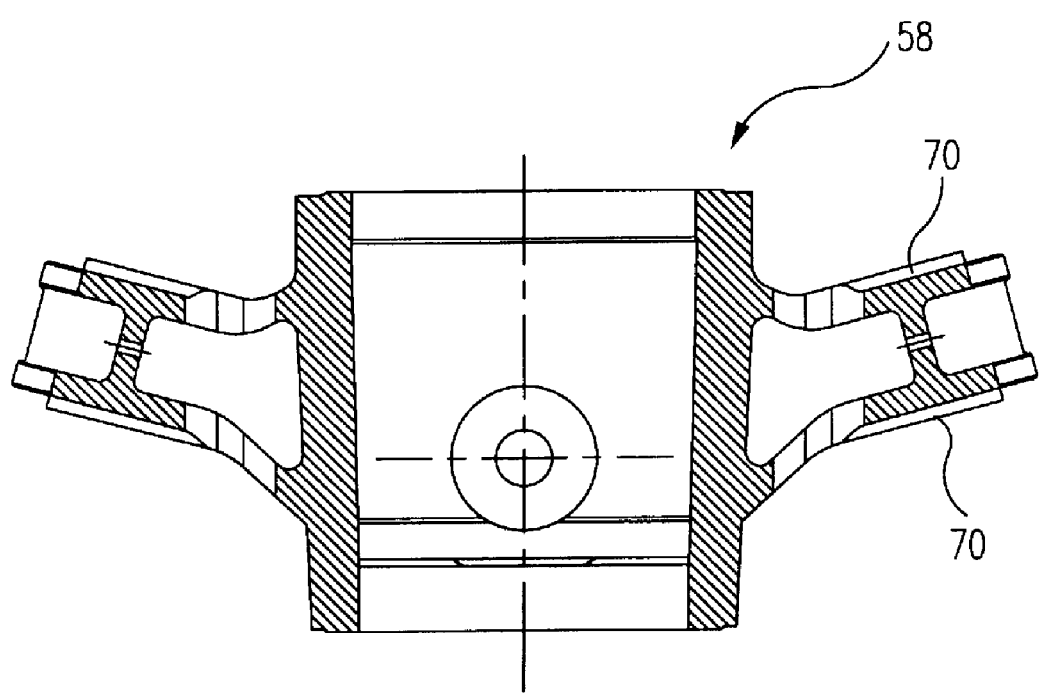
FIG. 11 is an enlarged side view of a portion of the hinge plate of FIG. 10A.

Controller assembly 56 controls hinge assembly 57 by manipulating control mechanism 69 (best seen in FIGS. 10A and 10B). The control mechanism acts in response to an input from controller 60 by applying a force to damping assembly 65a. In one embodiment the damping member is an elastomer or equivalent device in contact with the hinge thereby applying a spring force to the hinge. The control mechanism acts similar to an actuator for loading damping member 65. Thus, the controller adjusts the force on the damping member thereby adjusting the rigidity of the damping member. In turn, the biasing force on hinge 58 is adjusted, which ultimately adjusts the damping and stiffness of the hinge. Alternative structures and methods of adjusting the stiffness and damping of the hinge assembly may also be employed depending on the application.

Figure 12:
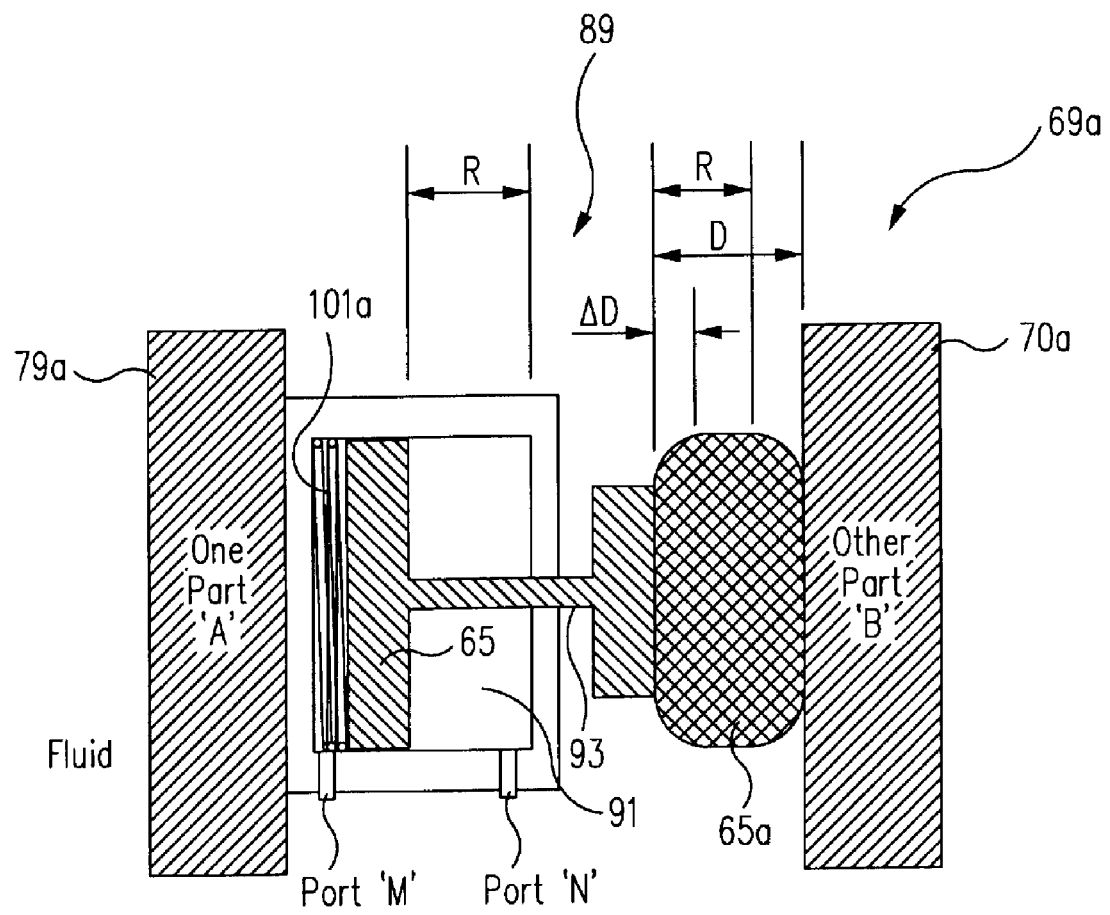
FIG. 12 is an enlarged schematic view of a portion of a controller mechanism similar to that of FIG. 10B for the hinge assembly of FIG. 1, illustrating a hinge controller with a hydraulic piston and damping member in accordance with the present invention.

Referring to FIG. 12, exemplary control mechanism 69 has a piston assembly 89 and series of loading members. The exemplary piston assembly includes a piston 93 in a chamber. In normal conditions, piston 93 acts as a damping member.

The exemplary piston assembly also includes a spring 101a and damping member 65 in the line of force. The exemplary mechanism includes several safety features. The exemplary damping member is pre-loaded by placing it into compression during normal operation. In the case of loss of power under a fault condition, such as when there is a loss of hydraulic circuit pressure, the optimum position of the piston is maintained by the spring force of spring 101''' and the force of damping member 65. The exemplary mechanism provides such that loss of hydraulic circuit pressure permits the spring to move the piston through range a range of motion "R," which may be an important safety feature.

Piston assembly 89 includes a chamber 54 and piston 56. The chamber is filled with hydraulic fluid and positioned adjacent to a mounting surface of hinge member 58 or other mounting surface. One end of the piston is positioned in the chamber and the other end is positioned in opposition to the one of the mounting surfaces. In operation and use, the piston assembly is actuated by modulating the hydraulic pressure in piston chamber 91 which in turn actuates piston 93. This causes the piston to apply or release pressure to adjust the rigidity of damping member 65. The hydraulic piston assembly has the added advantage of adding one more layer of damping to the system because teeter shock to the hinge assembly is transferred through the piston assembly and absorbed by the hydraulic fluid.

The controller assembly adjusts hinge assembly 57 based on the fluid flow 54, turbine parameters, and other factors. The controller assembly may adjust the hinge assembly at particular points in time, at intervals, or continuously. In one embodiment the controller allows the hinge assembly to move freely without adjustment.

Referring generally to FIGS. 3-11, the structure of the hinge assembly will be described in more detail. In one embodiment hinge mechanism 58 is configured as a rigid hinge plate 58 (also referred to as "teeter plate") with mounting flanges 67 in four quadrants. The mounting flanges serve as load surfaces configured to communicate with hub 42 and shaft 47. Hinge plate 58 includes two transverse pivot portions 58 extending along the teeter axis and configured to seat in receiving portions 60 of the hub.

As shown in FIGS. 10A and 10B, the hinge is mounted to the hub and positioned in a sandwich configuration between the hub and shaft. Accordingly, the hinge plate can rotate with the shaft about the shaft axis and can also pivot along teeter or pivot axis 49. In this manner the hinge member is configured for dampened pivotal movement orthogonal to the shaft. In one embodiment forces on the blades cause the hub to teeter, and the teeter force is transferred to the shaft through the damping assembly.

In one embodiment, four damping members 65 are positioned in each of the four quadrants adjacent to and on each side of the hinge plate mounting flanges such that the hinge assembly includes eight total damping members. Put another way, four pairs of damping members are positioned circumferentially around the shaft. On a front side 58 of the hinge plate each pair is positioned on opposite sides of the shaft between the front side and an opposing mounting surface of the hub, which in this case is receiving portion 60. On a back side 61 four damping members are positioned between the hinge plate and mounting surfaces 63 of the shaft (shown in FIGS. 3 and 10).

The damping member may be provided in alternative configurations including such configurations where it is positioned remotely from the hinge mechanism. The damping members apply a damping, or biasing, axial force to pivotal movement at each corner of the hinge mechanism. These forces may also be modeled as a bending moment about the transverse teeter axis. In one embodiment the hinge assembly is integrated in part with the hub. Together, hinge mechanism 58 and damping members 65 along with a portion of the hub make up hinge assembly 57.

In one embodiment, when the hinge assembly is in a neutral state, the damping member is compressed such that the hinge mechanism is pre-loaded. Neutral state refers to the state of the turbine where there is negligible or zero fluid flow. In one embodiment the teeter motion is continually under the influence of the damping member. In one embodiment the damping member is not pre-loaded and applies zero or negligible damping force in the neutral state.

In one embodiment hinge controller assembly 56 is substantially external to the hinge assembly. The only portion in cooperation with the hinge assembly is that portion that causes adjustment of the hinge assembly. Although the described configuration employs mostly mechanical structures to communicate control from the controller assembly to the hinge assembly, other methods may be used including electrical and hydraulic.

Hinge assembly 57 and controller assembly 56 may have other alternative configurations depending on the design requirements. The hinge mechanism may be a simple hinge or coupling with the controller assembly. The hinge assembly may also be in a non-contact configuration with the hub and/or the shaft. The hinge mechanism and controller assembly may be in the line of operation in part or entirely or other similar configurations as would be understood by one skilled in the art from the foregoing.

The damping member may include, but is not limited to, elastomerics, springs, foams, and the like. The damping member may also be electrical, chemical, or mechanical means for applying a damping force such as a pressured piston or solenoid. Regardless of the material type and configuration, damping member 65 applies a force or resists a compressive force. In other words, the damping member can absorb energy or counteract the force of the hinge member through a significant and useful range of the teeter motion. In one embodiment the damping member has an inherent rigidity—spring constant—over a significant range of motion. The damping member exhibits flexibility and has a constant spring force over a useable range of motion.

The type and configuration of the damping member may also be selected based on the calculated properties of the turbine to improve the turbine performance. An exemplar of such a method of selecting a static damping member is the '329 publication, incorporated in its entirety herein for all purposes. The damping member of my '329 publication is generally static because the damping force only changes in response to the hub teeter and exerts damping force based on the inherent elasticity of the damping member; the turbine does not actively adjust damping force based on factors external to the damping member.

The general rigidity of the damping member may be selected to counteract forces anticipated by modeling the turbine system as a mass-spring system. Because the turbine blades move swiftly, for example a tip speed of about 50-100 m/s, relative to the wind, for example about 5-25 m/s, undesirable forces may be transmitted throughout the turbine system. Each turbine blade may hit a specific irregularity of the fluid several times, which means that the resulting disturbance also in this case will have a frequency $\omega_{disturbance}$ which is equal to the rotational angular frequency $\omega_{rotation}$. Accordingly, the damping member may be selected to control the various anticipated components of the disturbance forces.

In one embodiment the damping member may be selected based upon the average or maximum anticipated disturbance forces transmitted through the system or specific components. In one embodiment the damping member is selected based on the hinge controller configuration to improve power yield. Likewise, many of the other turbine components may be selected in a similar manner in conjunction with the adjustment operation of the controller assembly.

In one embodiment the hinge member has a plurality of predetermined rigidity values based on the characteristics of the damping member and each of the rigidity values corresponds to a set of fluid field conditions. The rigidity values may be progressive or incremental, such as may be the case when the damping member is a stepped controller or similar electromechanical device acting on the hinge member. The hinge assembly and damping member may be selected to match the anticipated fluid field conditions such that the hinge controller selects one of the plurality of rigidity values based on one of the anticipated set of fluid field conditions.

In one embodiment the damping member is selected based in part on the anticipated disturbance forces, for example, with an initial rigidity chosen to counteract a specific disturbance force. In one embodiment a progressive damping member is selected that can be adjusted at least within a predetermined range. The predetermined range may be determined based on anticipated disturbance forces, loading forces, and the like or based on optimized power generation.

Referring to FIGS. 1-2, in various embodiments turbine 33 also includes one or more sensors 81b for measuring parameters of the turbine. The sensors may be used to measure, among other things, parameters of the fluid field forward of the turbine, yaw angle, pitch angle, blade loads, teeter angle, teeter damping, shaft rotational speed, and torque. The measured information may be used by controller 53 to determine a desired adjustment. In one embodiment one, of the yaw angle, fluid field, and teeter angle are measured and the hinge assembly is adjusted based on such measurement. In one embodiment the level of the load applied by the controller assembly to the hinge assembly, which adjusts the teeter damping and/or teeter angle, is based on the measured value.

Suitable sensors, which depend in part on the application, include, but are not limited to, a LIDAR sensor, pitot tube, or accelerometer. Sensors 81 may take measurements using contact or non-contact means. Contact means may include, but are not limited to, LVDT, capacitive proximity sensors, magnetostrictive sensors, and resistive sensors arranged to measure the length of a prescribed distance between a point on hub 42 and a point on hinge assembly 57. Non contact means may include, but are not limited to, optical, laser, acoustic, electromagnetic, and proximity sensors arranged to detect the relative position of the hub and the hinge assembly. In the case of proximity sensors measuring relative position of the hinge assembly, the measured value may be converted to angular coordinates to determine teeter angle or a speed of rotation along the teeter axis. In one embodiment tower oscillations are measured by a tower sensor and used by the controller to determine adjustment to teeter angle or teeter damping.

Referring to FIGS. 17, 18, 18B, and 18C, the method for operating controller assembly 56 will now be described. The controller assembly includes controller 53 for processing information and outputting a control signal. In one embodiment the controller is a computer processor configured to process input information and output a control signal. The controller assembly is optionally integrated with sensors 81 to monitor the turbine and its system components to determine an appropriate adjustment to the hinge assembly and other components.

In S1, the controller 67 receives input information. The input information may be sent from a user input device 94, sensor 105 other control device 88, other turbine 102 (e.g., when linked together in a wind farm), and similar devices. In one embodiment controller 67 is configured to receive input information from a user. For example, it may be desirable to change the programming of the controller without having to replace the controller or disassemble the turbine.

In S2, the controller processes the input information. The controller is optionally configured to receive the input information and select an operational characteristic level for a turbine component including, but not limited to, the hinge assembly. Based on the selected operational characteristic, the controller determines a necessary adjustment and control signal.

In S3, controller 53 outputs the control signal to control mechanism 69. When configured with other wind turbines, the controller may also receive input information from such other wind turbine and output information to such other wind turbines to improve performance for all the wind turbines. In one embodiment the controller assembly adjusts teeter damping in response to input information related to critical loading of a component, critical loading of the system, or drastic changes in power yield.

The controller assembly may also be configured to adjust an operational characteristic of hinge assembly 57 during acceleration or braking functions. For example, the controller assembly may receive input information indicating the beginning of an acceleration function, such as start-up, and signal controller mechanism 69 to increase the hinge stiffness to avoid wobbling. Operational characteristic refers to a characteristic of component during operation such as speed, torque, stiffness, damping, and the like.

Controller assembly 56 may adjust damping member 65 or any other components in response to input information based on a changing mode of the turbine. Such modes include, but are not limited to, service, power generation, park, and the transitions between each of these modes.

In S4, the turbine has been adjusted. In turn, the turbine performance will be affected in terms of power yield, fatigue loading, and the like.

In one embodiment a sensor 81 measures loading at each blade 40 and sends the measurements as input values to controller 53 where they are compared. Gross differences are processed by the controller to analyze turbine operation, for example, detecting a shut down of turbine 33. Such gross differences may result from a number of causes, for example, measurement system failure and teeter mechanism failure.

The operation of the sensors and the controller will now be described with particular reference to FIGS. 17, 18A, 18B, and 18C. In one embodiment controller 53 includes a programmed routine. The controller optionally includes memory and a look-up-table (LUT) having a plurality of value pairs. Each value pair includes a measured first value and a corresponding second value. Each value pairs corresponds to an operational value of the turbine. For example, the measured first value may be wind velocity measured by a forward sensor and for each measured value there is a corresponding teeter damping value.

Figure 18A:
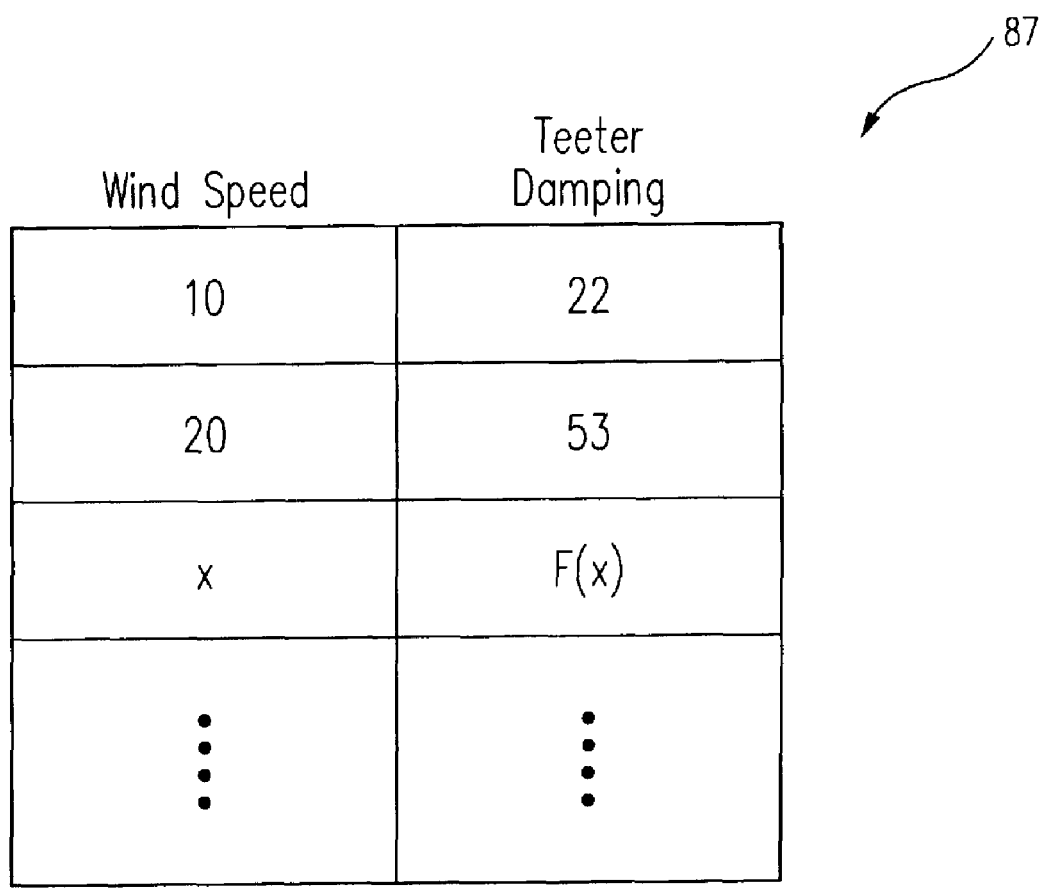

In operation, the controller receives a measured first value as an input and interpolates the look-up-table (LUT) (shown in FIGS. 18A and 18B) using the measured first value (e.g. M1) to determine a corresponding second value (e.g. E1) from which the controller adjusts the at least one operational characteristic to the corresponding second value. In the example of FIG. 18B, the controller would receive a measured wind speed and optionally measurements M1, M2, ... Mn, which correspond to estimates of power generation E1, E2, ... En. The controller determines a corresponding teeter dampening or adjustment and outputs a control signal based on these control values to adjust the hinge member.

Figure 18C:
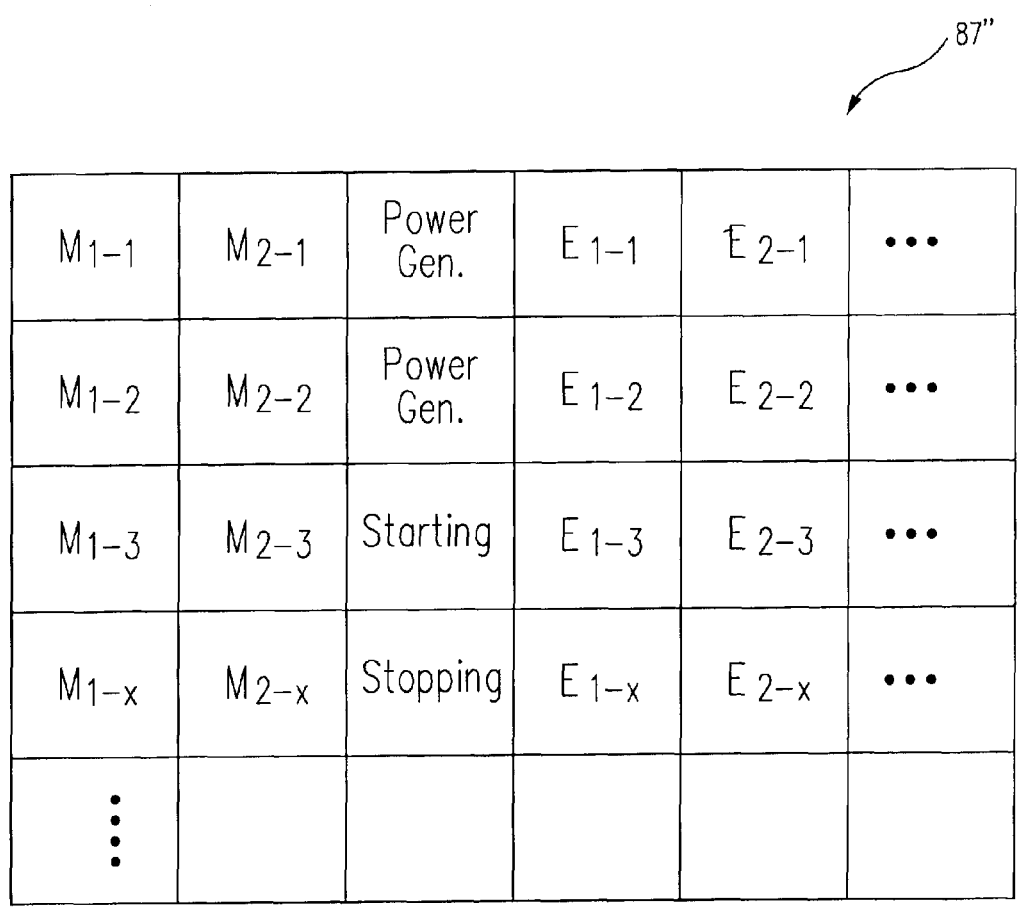

In various embodiments the LUT may be altered by adding sets of values instead of value pairs. For example, FIG. 18B illustrates a look-up-table with measured values (v, M1, M2, ... M2) in the four first columns and corresponding values (E1, E2, ... En) in additional columns. The corresponding values (e.g. E1) may be estimates or known values. For example, for a given set of (v, M1-Mn), the LUT suggests possible performance estimates of E1-En depending on the adjustment to be made. The final columns represent the control signals (C1, C2, ... Cn) to achieve the desired performance optimization. Each row represents a different time at which measurements were taken. FIG. 18C illustrates a similar table including a column with information related to the state of the turbine operation.

The table may also be composed of linear equations for two or more values or with other configurations depending on the application. In this manner the controller may process any number of input values to determine one or more control values and adjust the hinge member or other components accordingly. In one embodiment the controller includes memory for storing input values or control signals for "learning," error correction, and other applications. Further, the invention also provides for other configurations and manner for processing input information and determining output control values to adjust the turbine.

The turbine may further include a feedback sensor 81b to provide feedback to controller 53. In the exemplary embodiment of FIG. 17, controller mechanism 69 includes a closed loop controller 81b. In turn, the feedback information may be used to improve adjustment control or to detect errors. The feedback sensor may also measure a particular component, such as the hinge assembly, to verify that control assembly 56 and other control components are functioning as intended.

The method of operating a turbine in accordance with the present invention can now be described. In operation, generally, turbine system 30 harnesses the kinetic energy of the fluid flow and converts into electrical energy. Turbine 33 connects to generator 35 through drivetrain 44. The generator converts rotation of the shaft into power for transmission, typically electrical power.

The turbine system optionally includes a generator converter system coupled to the wind turbine generator for converting the power to a form for distribution to a utility power grid. An optional converter and transformer convert the power from the generator into a form for delivery to a utility power grid. The type of generator will vary depending on the turbine design and operation. The delivery of the generated power will further depend on the application. Typical users of turbines include, but are not limited to, small-scale commercial and residential users, independent power producers, and large-scale power utilities.

The power generated by the turbine depends on the size, scale, and type of the turbine. In general, larger-scale turbines have different design requirements than small and medium-scale turbines. In certain embodiments the turbine diameter is between about 50 meters and about 70 meters. In certain embodiments the blade diameter is between 50-70 meters. In one embodiment the blade diameter is one of about 54 meters and 59 meters, and the blade rotational speed is between 20 rpm and about 30 rpm at a rated wind speed of about 10 m/s and about 20 m/s. The turbine may produce nominal power of about 1000 kW under such conditions with an induction-type generator with variable slip.

As described above, hinge assembly 57 and controller assembly 56 may be used advantageously to improve or optimize power yield of the turbine. Power yield refers to power generated from given fluid flow conditions and indicates power generation efficiency. In contrast, conventional turbines are directed to avoiding critical loads than decrease turbine life and increase maintenance cost. Some conventional turbines are designed for increasing power yield by selecting component that match the anticipated fluid flow conditions.

In operation and use the turbine of the present invention allows for adjusting operational parameters during operation. The power generation of the turbine may be optimized in accordance with the principles described herein. As an example, generally, the power of the fluid can be estimated based on the following simplified equation:

$$P = \tfrac{1}{2} * (\rho A V) V^2$$

where P represents power, $\rho$ represents density (kg/m3), A represents area, and V represents velocity of the fluid. This equation is a highly simplified representation of the total power of the fluid, including the assumptions that the wind approaches the turbine from an orthogonal—perpendicular—direction and has a constant velocity over the area. The equation is provided for illustrative purposes only; however, the equation can be expanded upon to account for other information about the fluid field and complexities of the system as would be understood by one skilled in the art from the description herein.

Fluid flow characteristics are not the only determinants of power yield. Turbine operation plays an important part in power yield, and in some cases can be as significant as fluid flow conditions. For example, in wind turbine applications, the roughness and turbulence of the wind may be categorized into various standard classes. In lower classes, the turbine may produce power several orders higher than in higher classes. Although faster fluid flow generally increases power, turbines nonetheless generally have a limit at which power yield tends to decrease. Moreover, wide variations, fast changes, and other turbulence factors may negatively affect power yield. The device and methods of the present invention have been found to increase power yield and decrease component fatigue among other benefits.

In fact, most turbines have a range in which power generation increases rapidly with increasing fluid speed before eventually tapering off. In one embodiment the teeter angle or teeter damping is adjusted to take advantage of this fact. For example, the hub and blades may be oriented relative to the wind to optimize power yield.

The turbine of the present invention described above has several advantages over conventional turbines. For one, although some conventional turbines provide damped teeter movement, the teeter movement is passive and allow to happen in an uncontrolled manner. Such conventional turbines have achieved limited success for many reasons, among which is the fact that the damping control is often insufficient to counteract unbalanced forces in the system. Further, the damping control is complex and the teeter movement is largely uncontrolled.

In contrast, the turbine of the present invention includes a versatile, compact hinge assembly 57 that can be optionally built into hub 42 in whole or in part. The turbine of the present invention thus provides greater functional features in a simpler, and thus more reliable and cost-effective, structure than conventional devices.

The process of adjusting the turbine can now be described. Referring to FIGS. 17, 18A, 18B, and 18C, sensors 81 and controller assembly 56 are integrated into turbine system 30. In one embodiment, the controller assembly adjusts at least one operational parameter of the turbine at intervals or substantially continuously during the power generation mode. Sensors 81 measure or detect values of the turbine system. The sensors may be configured to sense characteristics of any number of things such as the fluid flow, turbine system, or generator. The measured or detected value of each sensor is transmitted as input information to controller 53.

Controller 53 processes input information and calculates control parameters. In one embodiment, the controller includes a look-up-table (LUT) having a set of operational parameters. Each set includes an operational parameter for the input value or values and corresponding values for the components to be adjusted. The controller receives a sensed value from the sensor and determines a set of operational parameters, the set including the sensed value and at least one corresponding value. The controller then sends a control signal, which based on the corresponding value, to controller mechanism 69. The control mechanism subsequently adjusts a component of the turbine in response to the control signal.

In one embodiment, the controller receives one or more input values from sensors 81 and selects an operational parameter based on a ranking of parameter scores. The controller receives from a first sensor event data with respect to one or more events sensed from the first sensor. The event data may relate to the fluid flow, turbine components, or operation of the turbine among other data to be sensed by the sensors during one or more time periods.

The controller next identifies a set of operational parameters of the turbine that correspond to the event data. For example, the controller may receive a wind speed value of 10 m/s as the event data and identify a set of teeter damping parameters corresponding to 10 m/s.

For at least a portion of the operational parameters in the identified set, the controller computes a performance value that is a function of the operational parameter. In one embodiment, the power generation is a function of an operational parameter of the turbine and the controller computes a power generation value for each of the parameters. In one embodiment, the performance value relates to fatigue loading or component life.

Next, the controller determines a parameter score for each operational parameter based on the computed performance value. The higher the performance value, the higher the score. The controller then ranks the operational parameters based on the computed performance values for each. Thereafter the controller selects one of the operational parameters based on the ranking. Factors other than the ranking may also be taken into consideration in selecting an operational parameter.

After an operational parameter has been selected, the controller sends a control signal to control mechanism 69. The control mechanism accordingly adjusts the turbine on the basis of the operational parameter. In one embodiment the operational parameter is one of a teeter angle or teeter damping level.

The entire process is then resumed at intervals or substantially continuously. The use of feedback information may further be integrated into the process at various stages to improve the control process.

Although described in one context above, the controller may be configured to process input information in a variety of other manner as would be understood by one skilled in the art based on the foregoing. In one embodiment the controller processes a multiplicity of input data values and selects an operational value based on several considerations. The controller first receives the input data values, the performance values being a function of each of the input data values. Next the controller selects a corresponding set of operational parameters and eventually one of the operational parameter values in the set based consideration of several factors among which performance value is only one.

The controller input information may also be received from other sources than sensors. For example, the input information may be received from other turbines when linked as part of a wind farm, input by a user, or received from another component controller.

FIG. 12 illustrates an alternative configuration for controller mechanism 69. In various embodiments, controller assembly 69a is similar to controller mechanism 69 described above but includes a piston-type mechanism for applying a dampening force to the hinge mechanism. The controller mechanism 69a includes a piston assembly 89 having a piston 93 and a chamber 91 adjacent to a mounting surface of the hinge member 70a or the shaft 79a. The exemplary piston assembly also includes a spring 101a which is configured to pre-load the device or apply a stop force. In operation and use, the piston assembly is actuated to apply or release pressure on each mounting surface thereby stiffening or loosening teeter of the hinge member.

Figure 13:
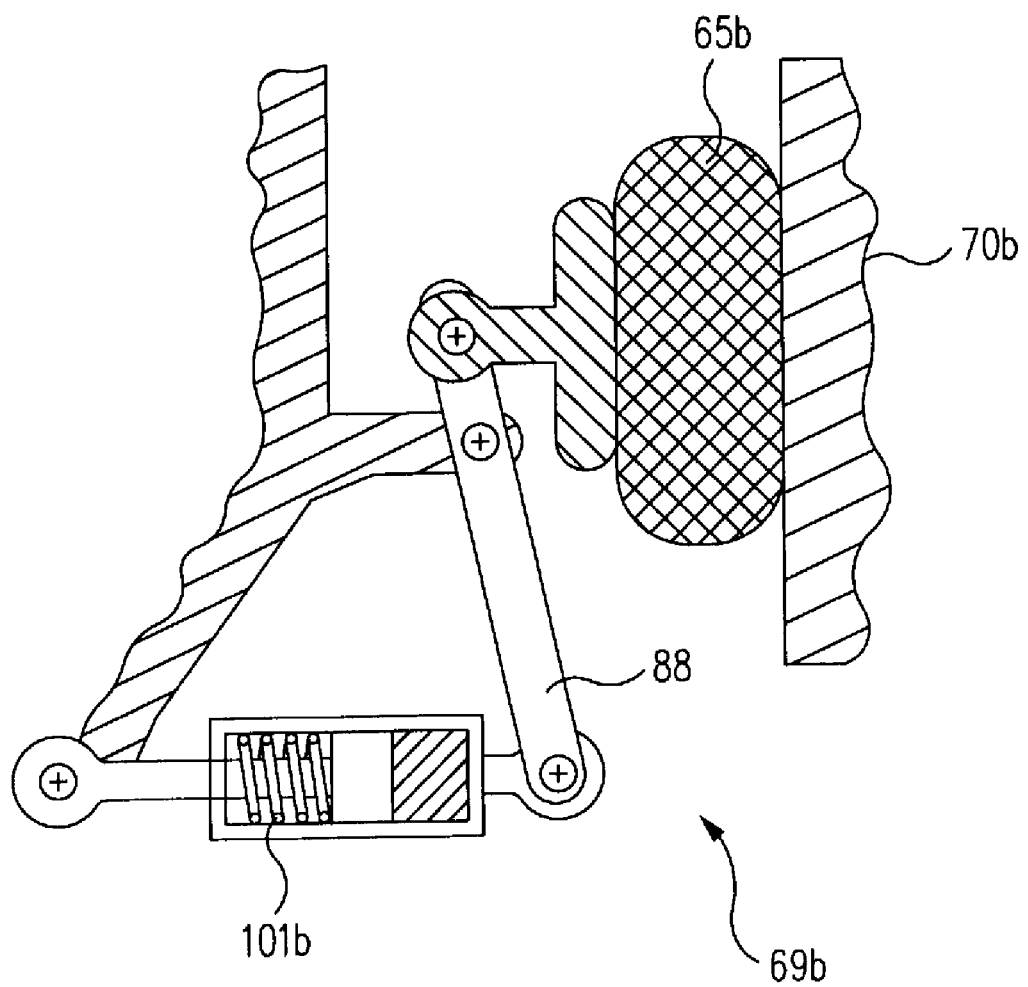
FIG. 13 is an enlarged schematic view of a controller mechanism similar to that of FIG. 10B, illustrating a hinge controller with an actuated lever arm in accordance with the present invention.

In various embodiments, controller mechanism 69b is similar to controller mechanism 69 described above but includes an actuated arm 88 as shown in FIG. 13. Like reference numerals have been used to describe like components. Controller mechanism 69b integrates with the hinge assembly and turbine similar to controller mechanism 69 described above. In operation and use, the arm is actuated to apply or release pressure to adjust the rigidity of damping member 65b on a surface 70b. A spring 101b is also provided to apply a biasing force.

Figure 14:
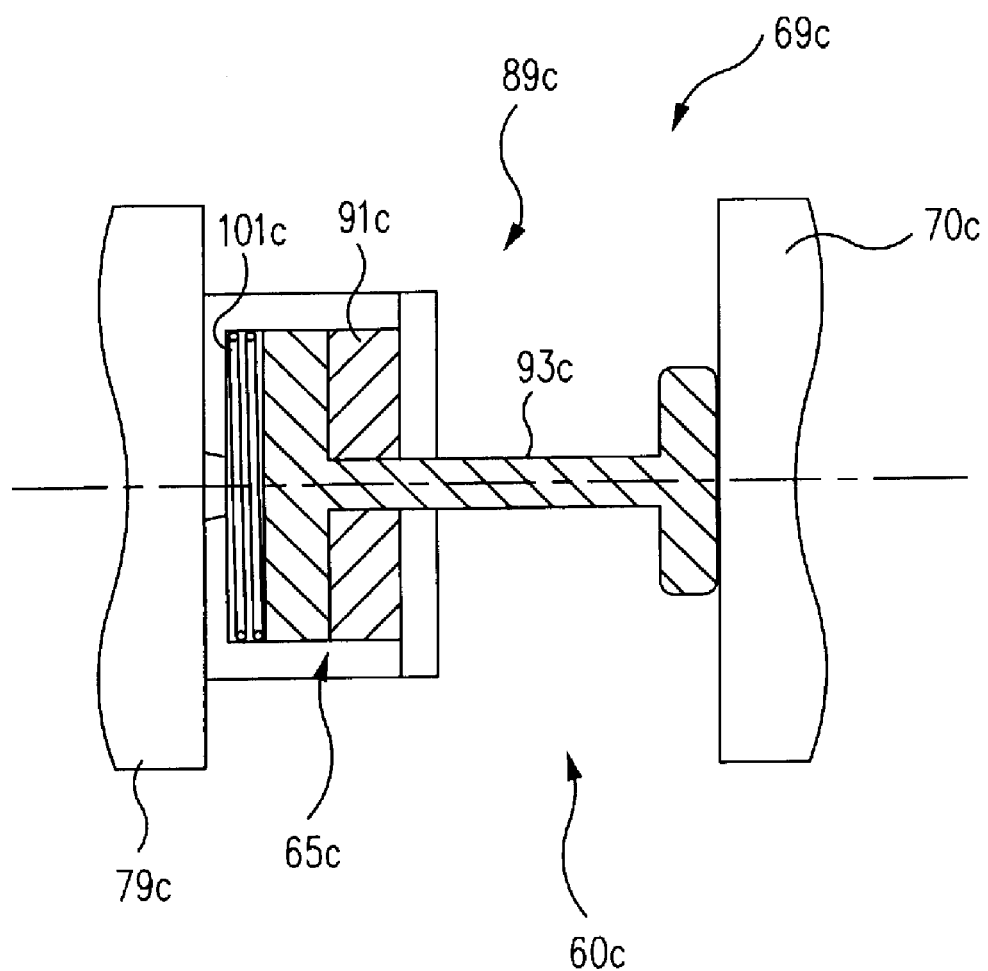
FIG. 14 is an enlarged schematic view of a controller mechanism similar to that of FIG. 10B, illustrating a hydraulic piston acting as a hinge controller and damping member in accordance with the present invention.

In various aspects of the present invention, controller mechanism 69c is similar to controller mechanism 69 described above but includes an hydraulic piston assembly 89 as shown in FIG. 14. Like reference numerals have been used to describe like components. Controller mechanism 69c integrates with the hinge assembly and turbine similar to controller mechanism 69 described above.

Piston assembly 89c includes a chamber 91c and piston 93c. The chamber is filled with hydraulic fluid and positioned adjacent to a mounting surface of hinge member 58c or shaft mounting surface 63c. One end of the piston is positioned in the chamber and the other end is positioned in opposition to the one of the mounting surfaces.

In operation and use, the piston assembly is actuated by modulating the hydraulic pressure in piston chamber 91c which in turn actuates piston 93c. This causes the piston to apply or release pressure on each mounting surface thereby stiffening or loosening teeter of the hinge member.

The exemplary piston assembly includes a spring 101c which is configured to spring 101c. In the case of loss of power under a fault condition, the optimum position of the piston is maintained primarily by the spring force. The exemplary mechanism also provides such that loss of hydraulic circuit pressure permits the spring to move the piston.

Figure 15:
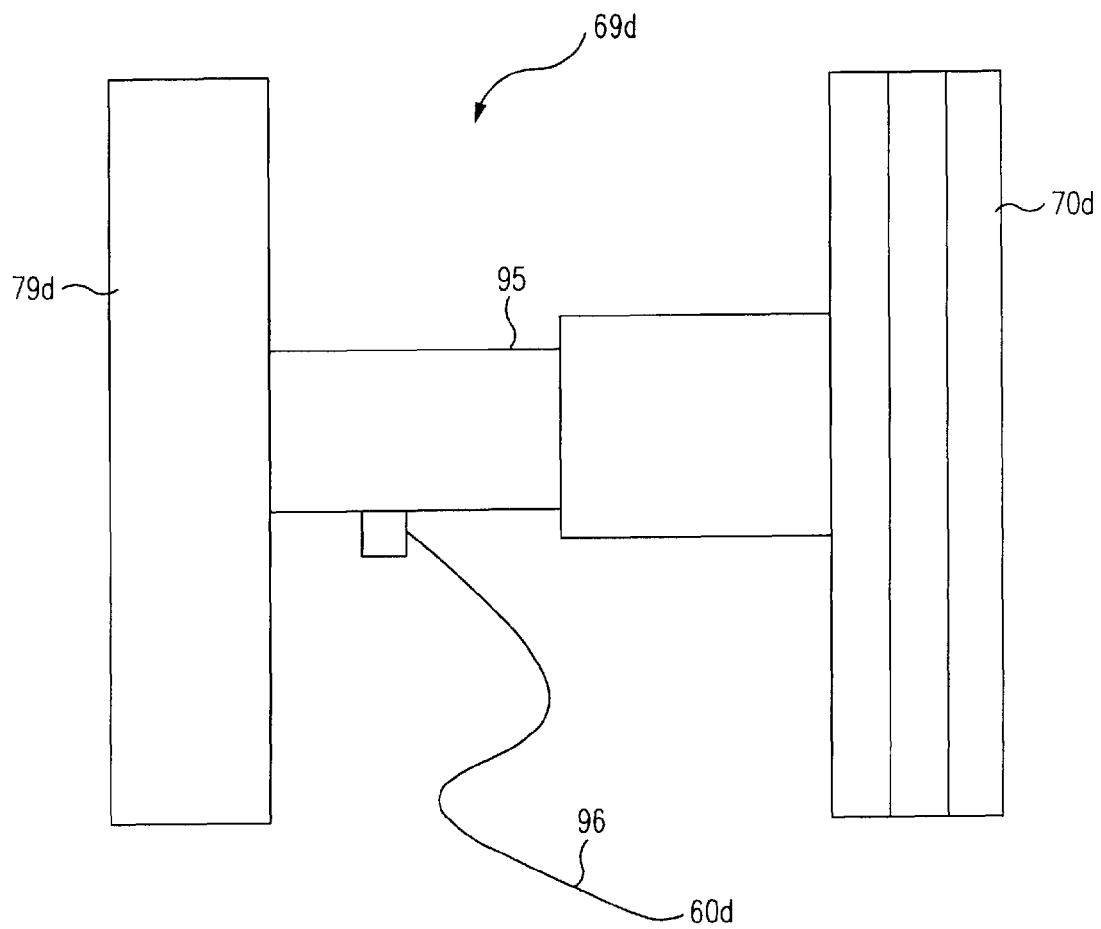
FIG. 15 is an enlarged schematic view of a controller mechanism similar to that of FIG. 10B, illustrating an electromechanical hinge controller.

In various embodiments, controller mechanism 69d is similar to controller assembly 56 described above but includes electromechanical means for adjusting damping member 65d as shown in FIG. 15. Like reference numerals have been used to describe like components. Controller mechanism 69d integrates with the hinge assembly and turbine similar to controller mechanism 69 described above. Controller mechanism 69d includes a solenoid 95 between mounting surfaces 79d and 70d of hinge member and shaft. A wire 96 connects controller 60d to the solenoid. In operation and use, the solenoid is actuated to apply or release pressure to adjust the rigidity of damping member 65d.

Figure 16:
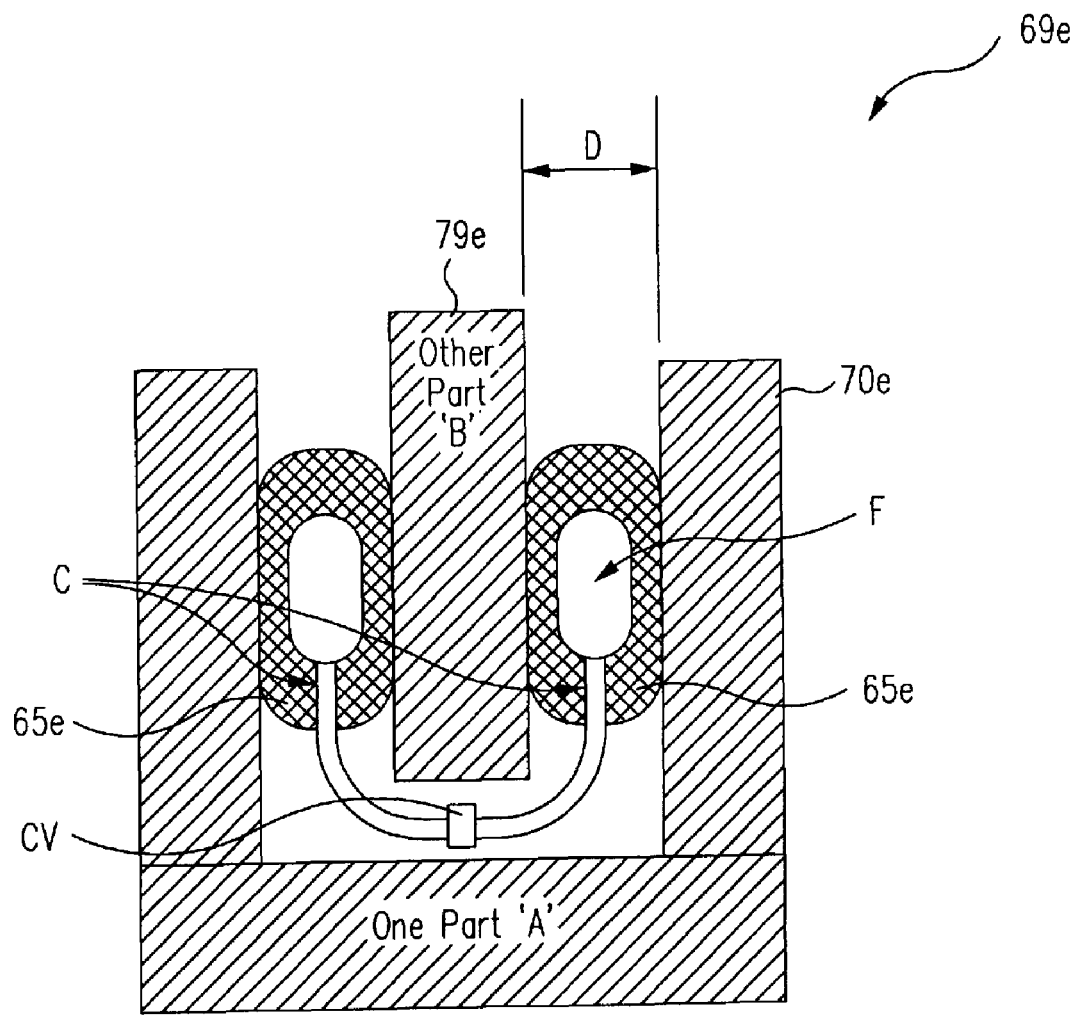
FIG. 16 is an enlarged schematic view of a controller mechanism similar to that of FIG. 10B, illustrating a hinge controller having damping members sandwiched between a portion of a hinge plate moving relative to a fixed component of the exemplary turbine in accordance with the present invention.
Figure 17:
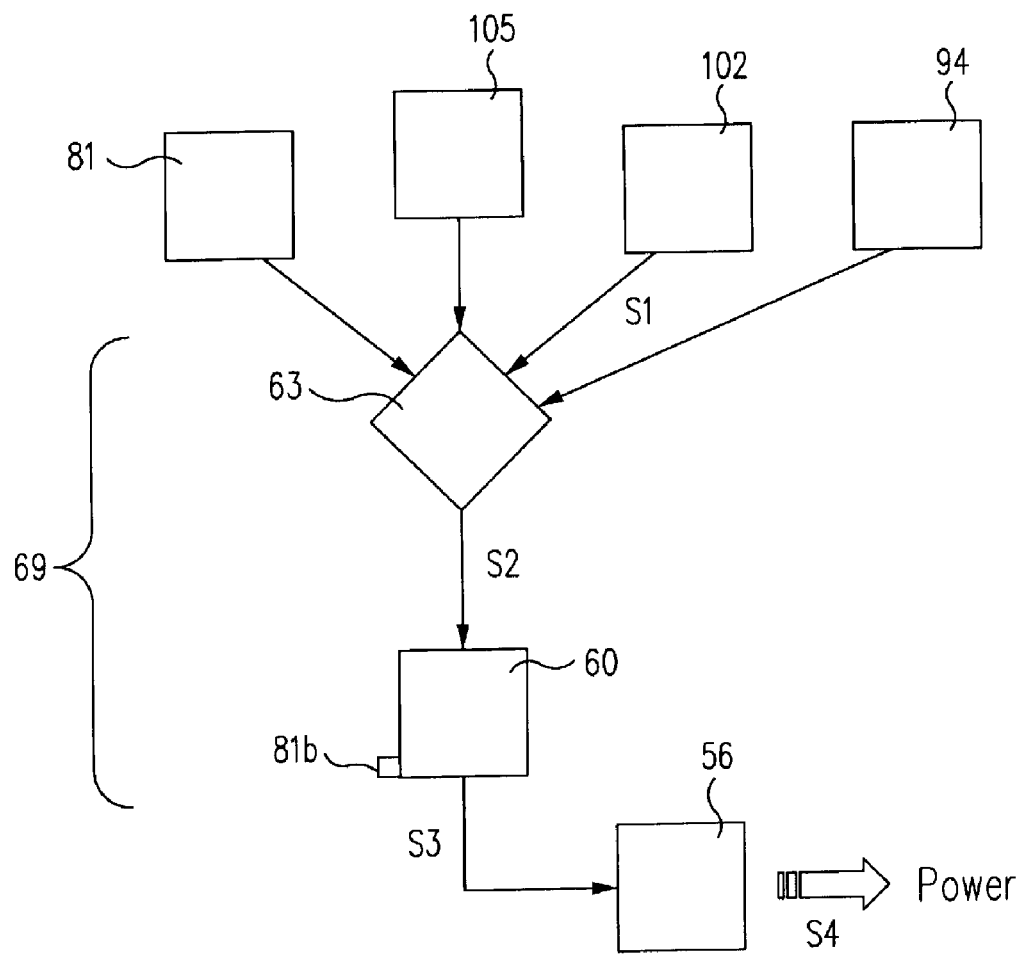
FIG. 17 is a block diagram illustrating the general operation and control of the turbine of FIG. 1 in accordance with the present invention.

In various embodiments, controller assembly 69e is similar to controller mechanism 69 described above but includes damping members 65e and fluid actuators as shown in FIG. 16. The damping member sandwich a moving component. A control valve is provided between the two exemplary damping member in accordance with the control of the force and size of each. Controller mechanism 69e is operated based on similar principles to those described above.

For convenience in explanation and accurate definition in the appended claims, the terms "up" or "upper", "down" or "lower", "inside" and "outside" are used to describe features of the present invention with reference to the positions of such features as displayed in the figures.

In many respects the modifications of the various figures resemble those of preceding modifications and the same reference numerals followed by subscripts "a", "b", "c", and "d" designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A turbine for use with a turbine generator, said turbine comprising:
    at least one turbine blade for positioning in a fluid flowpath;
    a hub mounting the at least one turbine blade;
    a rotatable shaft in operational communication with the hub via a hinge assembly, an axis of the hub being independent of an axis of the shaft;
    wherein the hinge assembly is disposed between the shaft and the hub to allow the hub to teeter at an angle relative to the shaft, and the hinge assembly is configured to adjust at least one of the teeter angle and dampening of the teeter; and
    a controller assembly comprising:
        a control processor for processing input information and sending a control signal; and
        a control mechanism configured to adjust at least one operational characteristic of the hinge assembly, when the at least one blade is positioned in the fluid flowpath, in response to the input information.

2. A turbine according to claim 1, further comprising an elongated tower mounting the turbine, wherein the controller assembly is configured to adjust the teeter angle to increase a clearance distance as the at least one turbine blade passes the tower.

3. A turbine according to claim 1, the controller assembly being configured to adjust the teeter dampening by applying a dampening force to the hinge assembly.

4. A turbine according to claim 3, wherein the controller is further configured to adjust a rotational velocity of the shaft based on the adjustment of the teeter dampening force.

5. A turbine according to claim 3, wherein the dampening of the hinge assembly is adjusted substantially continuously in response to at least one of the fluid flowpath and loading of the at least one turbine blade.

6. A turbine according to claim 5, wherein the turbine is a wind turbine and the loading is one of a fatigue loading, wind disturbance loading, wind shear loading, and rotational inertia loading.

7. A turbine according to claim 1, the hinge assembly including a pair of damping members on opposite sides of the shaft and positioned between a front side of the hinge member and an opposing surface of the hub.

8. A turbine according to claim 1, the shaft including a rigid mounting surface provided along and offset from a main rotating body, and the hub including a mounting surface opposing the hinge member,
wherein the hinge assembly further includes a plurality of pairs of damping members, the hinge member including a plurality of mounting flanges equally spaced around a central axis of the hinge member and positioned between the shaft mounting surface and hub mounting surface, each pair of the damping members positioned on opposite sides of the mounting flange in a sandwich configuration between the flange and rigid surfaces of the hub or the shaft to provide the dampening force to the teeter movement.

9. A turbine according to claim 8, the hinge assembly including four flanges and four pairs of damping members.

10. A turbine according to claim 1, the damping member has a progressive rigidity (k), the controller being configured to apply a force to the damping member thereby selectively adjusting the rigidity of the damping member.

11. A turbine according to claim 10, wherein the damping member is an elastomeric material.

12. A turbine according to claim 10, wherein the controller comprises:
a chamber adjacent to the shaft mounting surface;
a piston having one end positioned inside the chamber and an opposite end in communication with the damping member, an axis of the piston being different than the hub axis,
wherein actuation of the piston adjusts pressure on the damping member.

13. A turbine according to claim 1, wherein the controller is configured to adjust the dampening of the hinge assembly teeter during one of acceleration and braking of the at least one blade.

14. A turbine according to claim 1, wherein the control mechanism applies a bending moment to the hinge assembly to adjust the dampening of the hinge assembly.

15. A turbine according to claim 1, further including a feedback sensor configured to monitor performance of the turbine and transit information related to the performance to the controller as the input information.

16. A turbine according to claim 1, wherein the input information is related to at least one of disturbance force, shear force, fluid acceleration, and fluid velocity of the fluid flowpath.

17. A wind turbine system according to. claim 1, wherein the controller is configured to adjust at least one of a yaw angle of turbine in the fluid flowpath, a pitch angle of the at least one blade, and shaft torque based on the hinge assembly adjustment.

18. A turbine according to claim 1, further comprising:
a first sensor for measuring the pitch angle; and
a second sensor for measuring a teeter angle of the hinge assembly,
wherein the controller assembly adjusts the teeter angle or teeter dampening based on the pitch angle.

19. A turbine according to claim 1, further comprising a forward sensor for measuring a change n the flowpath upstream from the at least one blade in flowpath, wherein the controller adjusts the at least one operational characteristic in response to the measurement of the forward sensor.

20. A turbine according to claim 19, wherein the forward sensor is a LIDAR sensor.

21. A turbine according to claim 1, wherein the turbine includes two symmetrical blades extending from opposite sides of the hub.

22. A turbine according to claim 1, wherein the turbine is a wind turbine.

23. A turbine according to claim 1, wherein the fluid field is a wind field, further wherein the shaft communicates with the hub via a hinge mechanism.

24. A turbine according to claim 1, wherein the adjusting means applies a bending moment to the hub.

25. A turbine according to claim 24, the hinge mechanism comprising a hinge plate provided with a transverse pivot axis in a sandwich configuration between a mounting surface of the hub and a mounting surface of the shaft, a plurality of damping members provided on opposite sides of the hinge plate for dampening pivotal movement of the hinge plate.

26. A turbine according to claim 25, wherein the adjusting means includes a hinge controller mechanism configured to adjustably load the plurality of damping members thereby adjusting the bending moment applied to the hub.

27. A turbine according to claim 25, wherein the hinge member is pre-loaded.

28. A turbine system for generating energy from fluid flow, said system comprising:
a turbine according to claim 1; and
a turbine generator coupled to the turbine for converting rotation of the shaft to power.

29. A wind turbine system according to claim 28, further comprising a generator converter system coupled to the wind turbine generator for converting the power to a form for distribution to a utility power grid.

30. A wind turbine System for generating electric power, comprising:
a tower;
a rotor assembly disposed on said tower including at least one blade positioned in a fluid flow and disposed for rotation about an axis;
a hinge assembly configured to allow a change in a teeter angle of the rotor assembly;
a hinge stiffness and dampening change mechanism for dampening movement of the teeter angle by the hinge assembly;
a monitoring assembly for monitoring a measured value indicative of at least one of the fluid flow, rotation of the at least one blade, and a load on the at least one blade;
a processor for generating an estimated value of actual power generated by said wind turbine system based on the rotation of the at least one blade, generating a control power value based on the measured value, determining if the control value is greater than the estimated value, and transmitting a control signal to the hinge stiffness and dampening change mechanism based on the determining.

31. A method of adjusting fluid turbine in a fluid flow, said method comprising:
providing a fluid turbine including:
at least one turbine blade positioned in a fluid flow;
a hub connected to the at least one turbine blade along a rotational axis of the at least one blade;
a rotatable shaft in operational communication with the hub via a hinge assembly;

the hinge assembly disposed between the hub and the shaft, the hinge assembly configured to control an orientation of the hub in a direction of wind flow, the hinge assembly including:

a hinge member forming a teeter angle between the shaft and the rotational axis of the at least one blade, the hinge member including a damping member configured to provide a biasing dampening force against angular teeter movement of the hub relative to the shaft; and a hinge controller configured to adjust the biasing force of the hinge member movement;

the fluid turbine further including a controller assembly comprising a control processor for processing input information and sending a control signal; and a control mechanism configured to adjust at least one operational characteristic of the hinge assembly, when the at least one blade is positioned in the fluid flowpath, in response to the input information; and actively adjusting the dampening force of the hinge member in response to at least one of the fluid flow upstream from the turbine and present loading of the at least one blade.

32. A method according to claim 31, wherein the fluid flow is wind flow.

33. A method of generating power from a fluid flow, said method comprising:

providing a turbine according to claim 31;

providing a turbine generator in communication with the turbine, the turbine generator being configured to translate the mechanical rotation of the shaft into power;

positioning the turbine in the fluid flow path; and collecting the power from the turbine generator.

\* \* \* \* \*